US007142218B2

(12) United States Patent
Yoshida et al.

(10) Patent No.: US 7,142,218 B2
(45) Date of Patent: Nov. 28, 2006

(54) IMAGE DISPLAY DEVICE AND ELECTRONIC APPARATUS USING SAME, AND IMAGE DISPLAY METHOD OF SAME

(75) Inventors: Yasuhiro Yoshida, Nara (JP); Yoichi Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 660 days.

(21) Appl. No.: 09/849,272

(22) Filed: May 7, 2001

(65) Prior Publication Data

US 2001/0050757 A1 Dec. 13, 2001

(30) Foreign Application Priority Data

May 15, 2000 (JP) ............................. 2000-141256
Mar. 12, 2001 (JP) ............................. 2001-069365

(51) Int. Cl.

*G09G 5/02* (2006.01)
*H04N 7/01* (2006.01)
*F21V 33/00* (2006.01)
*G01D 11/28* (2006.01)
*G03B 21/14* (2006.01)
*G02B 6/00* (2006.01)
*G02B 6/26* (2006.01)
*F21V 7/04* (2006.01)
*H04N 5/04* (2006.01)

(52) U.S. Cl. ........................ 345/589; 345/593; 345/87; 348/444; 348/502; 348/602; 362/610; 362/84; 362/611; 362/30; 385/12; 385/50; 353/84

(58) Field of Classification Search ................ 348/642, 348/599, 609, 655, 602, 603, 658, 649, 557, 348/502, 560, 577, 578, 582, 662, 708, 208.13, 348/208.14, 222.1, 223.1, 224.1, 225.1, 227.1, 348/228.1, 229.1, 242, 258, 256, 265, 277, 348/370, 444, 450, 453, 222, 223–228, 208; 345/591, 593, 589, 597, 82–88, 207; 382/162–167; 353/66–70, 77, 84; 362/508–511, 1–2, 30, 362/216, 317, 327, 559–561, 609–612, 615, 362/516, 84, 642, 601, 603; 385/12, 18, 385/129–132, 50

See application file for complete search history.

(56) References Cited

U.S. PATENT DOCUMENTS 4,811,086 A * 3/1989 Hieda ...................... 348/227.1
4,918,519 A * 4/1990 Suzuki et al. ............ 348/224.1
4,953,011 A * 8/1990 Mori et al. .................... 348/30
5,053,871 A * 10/1991 Ogawa et al. .............. 348/366
5,351,080 A * 9/1994 Kyuma et al. ........... 348/225.1
5,510,835 A * 4/1996 Nishizawa et al. ......... 348/242
5,621,479 A * 4/1997 Akiyama .................... 348/648
5,784,507 A * 7/1998 Holm-Kennedy et al. ..... 385/31
5,926,153 A * 7/1999 Ohishi et al. ................ 345/1.1
5,956,015 A 9/1999 Hino
6,075,563 A * 6/2000 Hung ......................... 348/223
RE37,309 E * 8/2001 Nakashima et al. .......... 355/53
6,522,360 B1 * 2/2003 Miyawaki et al. .......... 348/347
2002/0012461 A1 * 1/2002 MacKinnon et al. ........ 382/164
2002/0163529 A1 * 11/2002 Evanicky ..................... 345/600
2003/0052868 A1 * 3/2003 Kagawa et al .............. 345/204
2004/0070565 A1 * 4/2004 Nayar et al. ................ 345/156

FOREIGN PATENT DOCUMENTS

DE 196 53 286 C2 6/1998
EP 0 891 077 A2 1/1999
GB 2 115 980 A 9/1983
GB 2 335 326 A 9/1999
JP 63-261327 A 10/1988
JP 4-243393 A 8/1992
JP 5-6159 A 1/1993

| | | | | |
|---|---|---|---|---|
| JP | 5-292536 | A | | 11/1993 |
| JP | 5-344531 | A | | 12/1993 |
| JP | 06-217338 | | * | 5/1994 |
| JP | 7-203478 | A | | 8/1995 |
| JP | 7-231394 | A | | 8/1995 |
| JP | 07255063 | | * | 10/1995 |
| JP | 9-186896 | A | | 7/1997 |
| JP | 9-21500 | A | | 8/1997 |
| JP | 9-215000 | A | | 8/1997 |
| JP | 10-108031 | A | | 4/1998 |
| JP | 410191378 | A | * | 7/1998 |
| JP | 10-304395 | A | | 11/1998 |
| JP | 10-308950 | A | | 11/1998 |
| JP | 11-75072 | A | | 3/1999 |
| JP | 11-134478 | A | | 5/1999 |
| JP | 2000-39876 | A | | 2/2000 |
| JP | 2000-66166 | A | | 3/2000 |
| JP | 2000-89733 | A | | 3/2000 |

OTHER PUBLICATIONS

Notice of Reasons for Refusal and English translation thereof mailed Nov. 2, 2004 in corresponding Japanese application No. 2001-069365.

German Office Action and English translation thereof mailed Feb. 4, 2005 in corresponding German application No. 101 22 949.6-32.

Japanese Notice of Reasons for Refusal and English translation thereof mailed Jul. 12, 2005 in corresponding Japanese application No. 2001-069365.

* cited by examiner

*Primary Examiner*—Wesner Sajous
(74) *Attorney, Agent, or Firm*—Nixon & Vanderhye, P.C.

(57) ABSTRACT

An image display device of the present invention is provided with a liquid crystal display panel for displaying an image in accordance with an input of a chrominance signal, a sensor for sensing light characteristics of external light, and a chrominance signal converter for converting a chrominance signal to be inputted into an image display section in accordance with an output of the sensor. The chrominance signal converter includes a target display color setting section for setting a color to display as an image agreeable with chromatic adaptation characteristics of human, according to the output of the sensor, and a color reproduction section for reproducing a target color set by the target display color setting section, by using three primary color with chromaticities suitable for the output of the sensor. The target display color setting section converts the chrominance signal into a chrominance signal of the target display color reproduced by the color reproduction section. Provided is an image with color tone, in which no change is sensed by a user, even if external light condition, that is the light characteristics of the external light.

35 Claims, 21 Drawing Sheets

FIG. 19

```
/**********************
  transform Program
        for
      colour
    coordinate
**********************/
#include <stdio.h>
void
main()
{
        float
d[4][3],a[3][3],b[3],c[3],dd[3],r[3][3],kk[3][3],ss,sss;
        int     i,j,k;

        /* input x & y of RGBW */
        printf("INPUT RGB and White¥n");
        printf("Rx Ry Gx Gy Bx By Wx Wy¥n");
        scanf("%f %f %f %f %f %f %f %f", &d[0][0],&d[0][1]
                                        , &d[1][0],&d[1][1]
                                        , &d[2][0],&d[2][1]
                                        , &d[3][0],&d[3][1]);
/*
        d[0][0] = 0.67;
        d[0][1] = 0.33;
        d[1][0] = 0.21;
        d[1][1] = 0.71;
        d[2][0] = 0.14;
        d[2][1] = 0.08;
        d[3][0] = 0.31;
        d[3][1] = 0.316;
*/
```

FIG. 20

```
/* calculate z from x & y */
for(i = 0; i < 4; i++){
        if((d[i][0] + d[i][1]) > 1.0){
          d[i][2] = 0.0;
        }
        d[i][2] = 1.0 - d[i][0] - d[i][1];
}

printf("MATRIX¥n");
for(i = 0; i < 3; i++){
  printf("¥t");
  for( j = 0; j < 3; j++){
        printf("%5.3f¥t",d[i][j]);
  }
  printf("¥n");
}
```

FIG. 21

```
/* caluculate matrix */
{
  int i1, i2, j1, j2;
  for(i = 0; i < 3; i++){
      i1 = i + 1;
      i2 = i + 2;
      if (i1 > 2) i1 = 0;
      if (i2 > 2) i2 = i2 - 3;
    for(j = 0; j < 3; j++){
      j1 = j + 1;
      j2 = j + 2;
      if (j1 > 2) j1 = 0;
      if (j2 > 2) j2 = j2 - 3;
      a[i][j] = d[i1][j1]*d[i2][j2] - d[i1][j2]*d[i2][j1];
    }
  }
}
/* calculate of BUNBO */
for(i = 0;i < 3; i++){
  b[i] = 0;
  for(j = 0; j <3; j++){
    b[i] = a[i][j] * d[3][j] + b[i];
  }
}
```

FIG. 22

```
/* MATRIX */
for(i = 0; i < 3; i++){
  for(j = 0; j < 3; j++){
    a[i][j] = a[i][j] / b[i];
    r[i][j] = a[i][j];
    if(i == j){
        kk[i][j] = 1.0;
    } else {
        kk[i][j] = 0.0;
    }
  }
}
/* INVERSE MATRIX */
for(i = 0; i < 3; i++){
  for(j = 0; j < 3; j++){
    dd[j] = a[j][i];
    a[j][i] = 0.0;
  }
  a[i][i] = 1.0;
  for(j = 0; j < 3; j++){
    c[j] = a[i][j] / dd[i];
  }
  for(j = 0; j < 3; j++){
    for(k = 0; k < 3; k++){
      a[j][k] = a[j][k] - c[k]*dd[j];
    }
  }
  for(j = 0; j < 3; j++){
    a[i][j] = c[j];
  }
}
```

FIG. 23

```
/* SEIKIKA */
ss = a[1][0] + a[1][1] + a[1][2];
sss = r[1][0] + r[1][1] + r[1][2];
for(i = 0; i < 3; i++){
  for(j = 0; j < 3; j++){
  a[i][j] = a[i][j] / ss;
  r[i][j] = r[i][j] / sss;
  }
}
```

FIG. 24

```
        /* result */
        printf("original data¥n");
        for(i = 0; i < 4; i++){
          printf("¥t");
          for( j = 0; j < 3; j++){
                printf("%7.5f   ",d[i][j]);
          }
          printf("¥n");
        }
        printf("MATRIX¥n");
        for(i = 0; i < 3; i++){
          printf("¥t");
          for( j = 0; j < 3; j++){
                printf("%7.5f   ",r[i][j]);
          }
          printf("¥n");
        }
        printf("INVERCE MATRIX¥n");
        for(i = 0; i < 3; i++){
          printf("¥t");
          for( j = 0; j < 3; j++){
                printf("%7.5f   ",a[i][j]);
          }
          printf("¥n");
        }
        for(i = 0; i < 3; i++){
          for(j = 0; j < 3; j++){
            kk[i][j] = a[i][0]*r[0][j] + a[i][1]*r[1][j] + a[i][2]*r[2][j];
          }
        }
        printf("KAKEZAN¥n");
        for(i = 0; i < 3; i++){
          printf("¥t");
          for( j = 0; j < 3; j++){
                printf("%7.5f   ",kk[i][j]);
          }
          printf("¥n");
        }
}
```

IMAGE DISPLAY DEVICE AND ELECTRONIC APPARATUS USING SAME, AND IMAGE DISPLAY METHOD OF SAME

FIELD OF THE INVENTION

The present invention relates to an image display device for displaying an image by receiving a chrominance signal, and an electronic apparatus using the device, and an image display method of the device.

BACKGROUND OF THE INVENTION

Recently, easy handling of a color image has been attained even in ordinary offices, as well as in offices of special fields, such as computer-graphic designing, when popularized are electronic apparatuses on a basis of color images. When a color image produced by a personal computer (PC) or digital still camera is transferred by electronic mail (E-mail), so that the color image is stored in a recording medium such as a hard disk, a floppy disk, or a recording medium of a digital still camera (for example, memory stick® or smart media®), and displayed on an image display device by using the data in the recording medium, the image display device generally has had difficulty in color investigation of the color image, because the sender and the receiver of the color image cannot match their colors. Color management has been contrived as a solution for the problem, and is drawing attention.

The color management equalizes differences in colors between each image display device by utilizing a common color space. In other words, color management attains an accordant expression of colors by describing all colors in a single color space, in which coordinates corresponding to the colors are accorded between colors of different devices. This is based on an idea that colors described by the same coordinates in a single color space have the same expression.

One color management method commonly used today corrects the differences between each device with a CIE-XYZ color space as the color space, and by using XYZ tristimulus values that are internal descriptive coordinates in the CIT-XYZ color space. Japanese Unexamined Patent Publication, Tokukaihei No. 11-134478 (published May 21, 1999), discloses a technology in which accordant color expression is achieved by this method.

FIG. 15 explains an environment in which each PC display image is viewed via the color management. A display image 152, which was displayed on a display device 151 of a sending PC, is displayed on a display device 153 of a receiving PC.

Generally, there is a difference between the sending PC and the receiving PC as to how much the color reproduction characteristics are changed with passage of time. Moreover, the transferred image is displayed on display devices with different color reproduction characteristics, respectively, and under a condition in which an image viewing condition and an environment, such as illumination light, are varied.

In FIG. 15, however, illumination light 154 of the sender and illumination light 155 of the receiver are varied. In this case, expression of an image is varied in accordance with the variation in illumination light. Thus, an isochromatic sensation cannot be attained, even though the image has the isochromatic color under one of the illumination lights. Moreover, when the display device is, for example, a transmission type liquid crystal display device (a transmission type LCD), long-time continuous use of the device causes a change in color filter characteristics with passage of time, and changes in a back light source due to a change in surrounding temperature and passage of time. This leads to changes in brightness and color of the displayed objects. Therefore, it has been a problem that long-time continuous use, which causes a far greater change in the expression of the image, cannot have an isochromatic sensation.

Image display devices equipped with a reflection type liquid crystal display device (a reflection type LCD) have been popularized for portable information terminals and PCs. Because its display theory is based on reflection of external light (light from the exterior of the device) such as illumination light, the reflection type LCD is affected more significantly by the external light in terms of display quality, compared to the transmission type LCD. Broadly speaking, two reasons, which are discussed below, explain the above characteristics of the reflection type LCD.

A first reason involves the fundamental theory of the reflection type LCD for displaying an image, understood with reference to FIG. 16.

FIG. 16 shows an example in which a reflection type LCD is used as a display device of a notebook-sized PC. Illumination light A strikes reflection type LCD 161, which emits light modulated by a color filter or a liquid crystal. The emitted light is denoted B. A user 162 of the image display device views the emitted light B. Needless to say, a change in the emitted light B gives the user 162 a feeling that image quality is changed.

FIGS. 17A–17E show examples of various characteristics, in which the horizontal axis is wavelength of light, and the vertical axis is relative intensity of light. For example, if the illumination light A in FIG. 16 had characteristics shown in FIG. 17A, while light modulation characteristics of the reflection type LCD are characteristics shown in FIG. 17B, the emitted light B in FIG. 16 would be described as shown in FIG. 17C, that is, as a product of the characteristics shown in FIG. 17A and those shown in FIG. 17B, where the product is calculated per wavelength. The emitted light B in FIG. 16 is changed as shown in FIG. 17E in accordance with a change of the illumination light A in FIG. 16 to be as shown in FIG. 17D. Moreover, the above-mentioned characteristics are discussed with reference to FIG. 18. FIG. 18 is a CIExy chromaticity diagram, in which indicates chromaticity coordinates of the emitted light B in FIG. 16 described in FIG. 17C. Meanwhile, x in FIG. 18 indicates chromaticity coordinates of the changed emitting light B shown in FIG. 17E. Thus, the user 162, viewing the emitted light B feels that the displayed color is changed from to x simply by a change in the illumination light A, and thus senses that the image quality is changed.

A second reason involves human vision, which has characteristics to adapt to color of illumination light. Therefore, the reflection type liquid crystal, which displays an image by using illumination light as its lighting source, needs to take the adaptation characteristics of humans in consideration for displaying. Otherwise, a' change in the image quality is noticed.

The change of the displayed color from to x in FIG. 18 is due to the change of the illumination light A from the light with the characteristics shown in FIG. 17A to the light with the characteristics shown in FIG. 17D. In most cases, the user 162 of FIG. 16 views the LCD under this illumination. In other words, he adapts to the illumination light A. A change of the illumination light in FIG. 17A into that in FIG. 17D indicates that the adaptation condition is also changed.

Thus, a human cannot sense precisely the change of the displayed color from to x in FIG. 18, which is caused by the change in the illumination light. For example, the user 162, who senses a color of in FIG. 18 under the illumination light in the FIG. 17A, feels that a color of x in FIG. 18 looks like a color of in the FIG. 18, because the adaptation condition is varied with a change of the illumination to be as shown in the FIG. 17D.

In any case, a change in the illumination (external light) gives the user a sensation that the image quality of the LCD varies.

SUMMARY OF THE INVENTION

The present invention has an object to provide an image with color tone, in which no change is sensed by a user even when external light condition (light characteristics of external light) is varied.

In order to attain the above object, an image display device of the present invention is provided with an image display section for displaying an image in accordance with an input of a chrominance signal, and a chrominance signal converter for converting the chrominance signal to input into the image display section, in accordance with light characteristics of external light that strikes onto the image display section.

Here, the wordings "external light" denotes light from a light source in an exterior of the image display section, such as sunlight or a fluorescent lamp, but not a back light installed in an interior of the image display section. In general, when a user views an image displayed on the image display section, tint of the image appears to be changed depending on types of the external light that strike onto the image display section. Therefore, the chrominance signal to input into the image display section may be corrected for every type of the external light, in order that the image, which looks differently for different types of the external light, is always viewed in similar tint of color. Moreover, the types of external light can be identified by detecting light characteristics of the external light. Typical light characteristics are wavelength characteristics, which provide an easy identification of the external light.

Therefore, with the above arrangement wherein displaying of an image is carried out by using the chrominance signal converted in accordance with the light characteristics of the external light, it is possible to offer an image with the color tone, in which no change is sensed by users even when the external light characteristics, that is, the types of the light source are varied.

For a fuller understanding of the nature and advantages of the invention, reference should be made to the ensuing detailed description taken in conjunction with the accompanying drawings.

BRIEF DESCRIPTION OF THE DRAWINGS

FIG. 19 is a view showing a setting part of a converting program with respect to chromaticity coordinates.

FIG. 20 is a view showing a part of a program for calculating z from x and y.

FIG. 21 is a view showing a part of a program for calculating a matrix.

FIG. 22 is a view showing a part of a program for calculating a matrix and an inverse matrix.

FIG. 23 is a view showing a part of a program for carrying out calculation for normalization.

FIG. 24 is a view showing a part of a program for illustrating results of the calculations in FIGS. 19 to 23.

DESCRIPTION OF THE EMBODIMENTS

[First Embodiment]

Explained below is an embodiment of the present invention. Note that, an LCD is used as an illustrative example of an image display device in the present embodiment.

Figure 1:
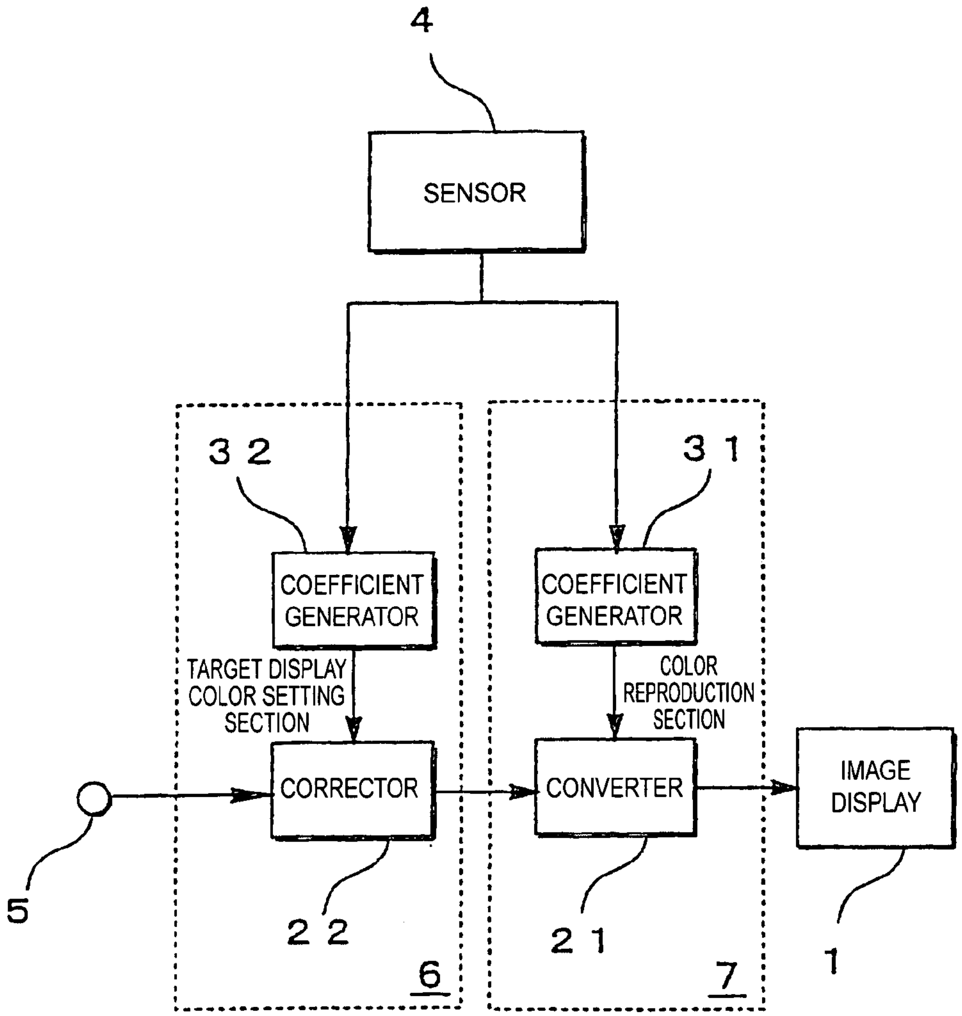
FIG. 1 is a schematic view showing a schematic structure of an example of an image display apparatus of the present invention.

As shown in FIG. 1, the LCD of the present embodiment is provided with a sensor 4 for sensing light characteristics of external light (illumination light: hereinafter, referred to as external light condition). A target display color setting section 6 sets a color to display in accordance with an output of the sensor. A color reproduction section 7 displays the set target display color by using three primary colors in arbitrary chromaticities. A chrominance signal converter is structured with the target display color setting section 6 and the color reproduction section 7.

FIG. 1, also shows a liquid display panel 1 (an image display section) and a signal input terminal 5.

The LCD shown in FIG. 1 is used as an external display device of a PC, or assembled in a notebook-sized PC. In the case of the former, the signal input terminal 5 is connected to an output terminal of the PC. The latter has basically the same type of connection as the former, while the exact location of the connection cannot be indicated here since the latter is assembled inside the notebook-sized PC.

The following description explains actions of the respective sections. The LCD panel 1 is a display panel with ability to perform color display. Color can be expressed, for example, by a combination of three primary colors: red, green and blue (hereinafter, referred to as RGB, respectively). The target display color setting section 6 is a section for determining by calculation what is the preferable color for displaying a signal input into the signal input terminal 5, considering chromatic adaptation of the human vision system to illumination light.

The following is a brief explanation of the chromatic adaptation of human vision system. The chromatic adaptation indicates such characteristics of vision system that sensitivity characteristics of vision system vary in accordance with the illumination in such a manner that visual information can be obtained without significant effect of a change in the illumination light. When moving from the indoors with illumination by a fluorescent lamp to outdoors with a glow of the setting sun, the entire sight is sensed in reddened colors for a moment. But, gradual restoration of normal color perception takes place until, in the end a color perception is regained which is almost equivalent to the color perception in ordinary time. This is because the sensitivity characteristics of the vision system are changed from a status adapting to the fluorescent lamp to a status adapting to the glow. However, the restored color perception in the end cannot be perfectly identical with the previous color perception. Thus, residual error remains.

The target display color setting section 6 forecasts such a change of the adaptation status, then finds out in advance a color to display in order to make a user perceive a right color (hereinafter, such a color is referred to as a corresponding color) without the residual error. Such calculation can be performed by using von Kries's chromatic adaptation model, for example.

Figure 2:
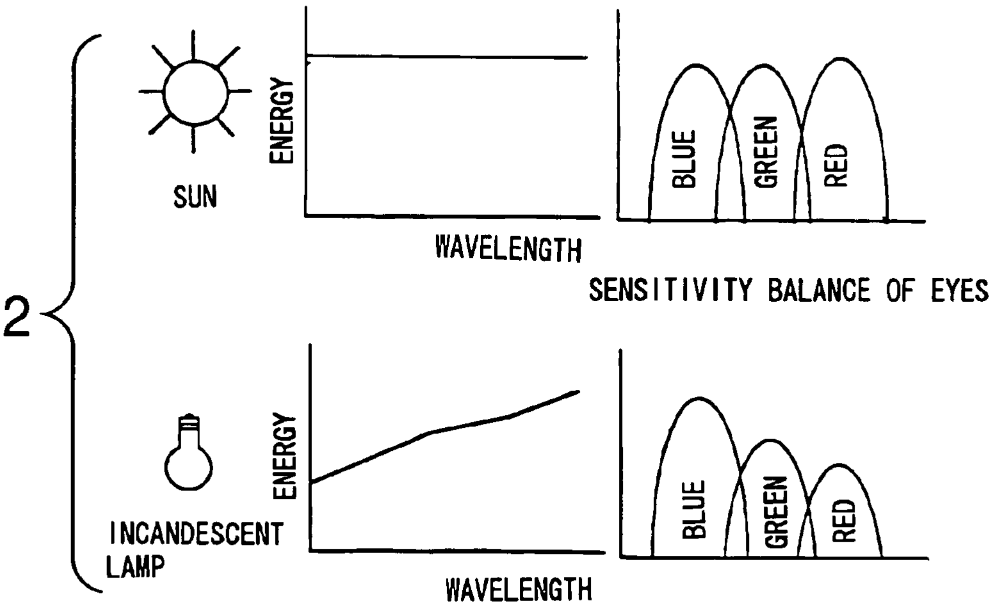
FIG. 2 is a view explaining adaptation effect of human vision system.

The following is a detailed explanation on the color calculation by employing the von Kries's model. The von Kries model assumes that, in order to find the corresponding color, that eyes have sensors with different spectral sensitivities, respectively, and corresponding to the three primary colors, red, blue and green, as shown in FIG. 2. The energy vs. wavelength graphs of FIG. 2 indicate relative intensity of energy with respect to wavelength of respective light, where sunlight and a incandescent lamp are discussed. The graphs at a right-hand side of FIG. 2 explain sensitivity balance of the eyes with respect to the respective light by showing relative sensitivity with respect to wavelength of the light. According to a change in spectral distribution of the illumination light, the sensors change their sensitivities so that expression of white is constant. Von Kries defined this as the chromatic adaptation system.

For example, as in the above FIG. 2 example where the illumination is changed from the daylight to the incandescent lamp, spectral distribution of the daylight is flat, as a whole. Therefore, the sensitivities of eyes for red, blue and green are well-balanced. However, the incandescent lamp has an intense red color component with a feeble blue color component. Thus, the sensitivity of the red sensor of the eyes is decreased, while the sensitivity of the blue sensor is increased. As a result, a constant response to white is achieved any time, resulting in no change in color expression.

Where (XYZ) are tristimulus values of a color of an object under first illumination (hereinafter, referred to as testing light), while (X'Y'Z') are tristimulus values of corresponding color when the first illumination is changed to another illumination (hereinafter, referred to as standard light), and assuming the testing light is light source A and the standard light is light source D65, for example, von Kries's color adaptation forecasting equation gives the following:

$$\begin{bmatrix} X' \\ Y' \\ Z' \end{bmatrix} = \begin{bmatrix} 1.127 & -0.438 & 0.427 \\ -0.011 & 1.011 & 0.002 \\ 0 & 0 & 3.068 \end{bmatrix} \begin{bmatrix} X \\ Y \\ Z \end{bmatrix}. \quad \text{Equation 1}$$

This matrix (a color correction coefficient) can be obtained by a calculation, which is employed in chromatological engineering, using arbitrary testing light and arbitrary standard light. This will be explained later.

For example, where a color is described by tristimulus values: X=28.00, Y=21.26, and Z=5.27 under the light source A as the testing light, its corresponding color under D65 is calculated as X'=24.49, Y'=21.20, Z'=16.17 from this equation.

Hence, use of the von Kries's model can find which color should be displayed for attaining color expression as expected in a particular adaptation status, by referring to tristimulus values of light to which the human vision system is adapting. The calculation using the von Kries's model is explained above, but the present invention is not limited by this.

Described below is a method of determining the von Kries's chromatic adaptation equation. Basically, the von Kries's chromatic adaptation equation is described as follows:

$$\begin{bmatrix} X' \\ Y' \\ Z' \end{bmatrix} = (M)^{-1}(D)(M) \begin{bmatrix} X \\ Y \\ Z \end{bmatrix}. \quad \text{Equation 2}$$

By using Pitt's chormaticity coordinates of fundamental three primary colors of vision system, (M) and $(M)^{-1}$ are defined by:

$$(M) = \begin{bmatrix} 0.071 & 0.945 & -0.016 \\ -0.461 & 1.362 & 0.101 \\ 0 & 0 & 1.000 \end{bmatrix}, \quad \text{Equation 3}$$

$$(M)^{-1} = \begin{bmatrix} 2.558 & -1.775 & 0.220 \\ 0.866 & 0.133 & 0.000 \\ 0 & 0 & 1.000 \end{bmatrix}, \quad \text{Equation 4}$$

respectively. Meanwhile matrix D is defined by:

$$(D) = \begin{bmatrix} RO'/RO & 0 & 0 \\ 0 & GO'/GO & 0 \\ 0 & 0 & BO'/BO \end{bmatrix}. \quad \text{Equation 5}$$

Here, tristimulus values of white color under the testing light A and those under the standard light D65 are denoted by (X0, Y0, Z0) and (X0', Y0', Z0') respectively, and have values as follows:

$$\begin{matrix} X0 = 109.8 & X0' = 95.0 \\ Y0 = 100.0 & Y0' = 100.0 \\ Z0 = 35.0 & Z0' = 108.9 \end{matrix}. \quad \text{Equation 6}$$

Therefore, a matrix M gives:

$$\begin{matrix} R0 = 101.68 & R0' = 99.50 \\ G0 = 88.98 & G0' = 103.19 \\ B0 = 35.50 & B0' = 108.90 \end{matrix}. \quad \text{Equation 7}$$

It is easy to find the tristimulus values of the white color under the testing light A and those under the standard light D65: (X0, Y0, Z0) and (X0', Y0', Z0'), with respect to colorimetry, when the wavelength distribution of the illumination light is found. For example, the tristimulus values can be determined by:

$$G = \int \bar{g} \cdot W d\lambda. \quad \text{Equation 8}$$

Where, $\bar{g}$: Isochromatic Functions $\bar{x}$,$\bar{y}$,$\bar{z}$

W: Wavelength Distribution of Illumination Light

G: Tristimulus Values of White color to find; (X0, Y0, Z0) and (X0', Y0', Z0')

Next, with substitution of the determined values, the Equation 5 gives;

$$(D) = \begin{bmatrix} 0.979 & 0 & 0 \\ 0 & 1.116 & 0 \\ 0 & 0 & 3.068 \end{bmatrix}. \quad \text{Equation 9}$$

Therefore, the tristimulus values of the corresponding color are determined as follows;

$$\begin{bmatrix} X' \\ Y' \\ Z' \end{bmatrix} = (M)^{-1}(D)(M) \begin{bmatrix} X \\ Y \\ Z \end{bmatrix} = \begin{bmatrix} 1.127 & -0.438 & 0.427 \\ -0.011 & 1.011 & 0.002 \\ 0 & 0 & 3.068 \end{bmatrix} \begin{bmatrix} X \\ Y \\ Z \end{bmatrix}. \quad \text{Equation 10}$$

In the series of equations, all the calculations can be performed perfectly if the tristimulus values of the illumination light are available. The tristimulus values of the illumination light can be determined easily by using the integral equation shown in Equation 8 if the wavelength distribution of the illumination light is known. Therefore, the tristimulus values can be determined by grasping the wavelength characteristics of the illumination light by using the sensor.

The determination of the tristimulus values gives a matrix for finding the corresponding color. The above-mentioned calculations can be carried out easily by using a simple CPU and a software module.

Because the relationship between RGB and XYZ can be converted by a simple linear matrix, by determining the matrix one can find which corresponding color is expressed by which types of conversion of RGB signal of the chrominance signal inputted into the signal input terminal 5.

Explained above is the target display color setting section 6. The target display color setting section 6 is realized with a target display color setting matrix generator (a target display color setting coefficient generator) 32 and a target display color correction section 22, which performs color correction of the target color. The former is a section for determining a matrix, while the latter is for actually executing conversion of the RGB signal of the chrominance signal inputted into the signal input terminal 5 by multiplying the signal by the matrix. Those processes have been already discussed above.

The color reproduction section 7 is explained below. Considering changes in the chromaticities of three primary colors due to various reasons, the color reproduction section 7 carries out a process for displaying the color set by target display color setting section 6, by using three primary colors after the changes.

As discussed above, the display color itself is varied with a change of the illumination light, for example, in the case of the reflection type LCD. This is due to the changes in the chromaticities of the three primary colors of the reflection type LCD. An example of the changes is given in FIG. 3, in which an xy chromaticity diagram is shown.

Figure 3:
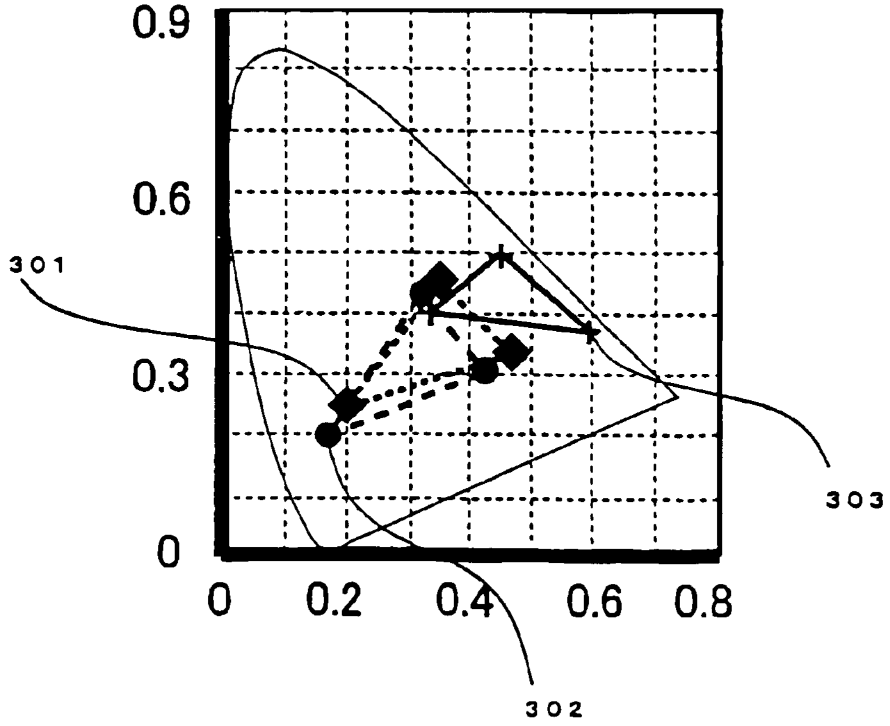
FIG. 3 is a graph showing a color gamut of a reflection type LCD.

FIG. 3 gives the example showing how the chromaticities of the three primary colors in a reflection type liquid crystal are changed, in a case 302, a case 301 and a case 303, where the illumination light is light D65, light D50, and light A, respectively. The illumination light is not limited to those, and any light causes the changes in chromaticity coordinates of the three primary colors.

The role of the color reproduction section 7 is to carry out the process for displaying the color that has been set by target display color setting section 6, by using three primary colors after the changes, considering those changes in the chromaticities of three primary colors due to the various reasons, such as the changes of the illumination light.

This process is carried out as follows. First, the choromaticity coordinates of the three primary colors are determined, then a matrix is determined for displaying an arbitrary color rightly by using the three primary colors having the colormaticity coordinates. Subsequently, the output of the target display color setting section 6, which was determined before, is multiplied by the matrix.

The chromaticity coordinates values of the three primary colors are easily determined when the wavelength distribution characteristics of the illumination light are known, as long as the optical wavelength distribution characteristics of the liquid crystal are known. The optical wavelength characteristics can be determined from designing conditions, while the wavelength characteristics of the illumination light are found by the method mentioned above. The chromaticity coordinates values of the three primary colors are determined from the optical wavelength characteristics and the wavelength characteristics of the illumination light, after all.

Determining the matrix for displaying the arbitrary color rightly by using three primary colors of certain chromaticity coordinates can be carried out quantitatively with respect to colorimetry. A detailed explanation on the theory is omitted, since, e.g., programs written in C language are shown in FIGS. 19 to 24. FIG. 19 shows a setting portion of a converting program with respect to the chromaticity coordinates. FIG. 20 shows a portion of a program for calculating z from x and y. Shown in FIG. 21 is a portion of a program for calculating a matrix. In FIG. 22, a portion of a program for calculating a matrix and an inverse matrix is shown. FIG. 23 shows a portion of a program for carrying out a calculation for normalization. Given in FIG. 24 is a portion of a program for showing results of those calculation.

The programs shown in FIGS. 19 to 24 are programs for finding the matrices necessary for displaying the color, which is identical with the color shown when the original three primary colors are used, by utilizing the three primary colors having varied chromaticity coordinates values. In order to carry out the above process, the color reproduction section 7 shown in FIG. 1 is provided with a color reproduction matrix generator (a color reproduction coefficient generator) 31 for finding the matrices by using the programs shown in FIGS. 19 to 24 after the receipt of the output of the sensor 4.

Subsequently, by using a matrix MTX obtained by the processes, the outputs R', G', and B' are calculated by:

$$\begin{bmatrix} R' \\ G' \\ B' \end{bmatrix} = (MTX)\begin{bmatrix} R \\ G \\ B \end{bmatrix}. \qquad \text{Equation 11}$$

By substituting the output R', G', and B', for the three primary colors having the varied chromaticity coordinates values, the color identical with the original color can be attained. The calculation is a simple matrix calculation, and carried out by a color converter 21 shown in FIG. 1. A satisfactory function can be obtained by assembling a CPU with a software module formed in advance with those programs.

The following description provides an explanation on the sensor 4.

The sensor 4 is for measuring the wavelength characteristics of the light illuminating the LCD. The sensor 4 measures the wavelength characteristics of the light, which strikes onto the LCD and has wavelength characteristics to resolve into at least more than two different wavelength regions, then the sensor 4 outputs the chromaticity coordinates values of the light.

Figure 4:
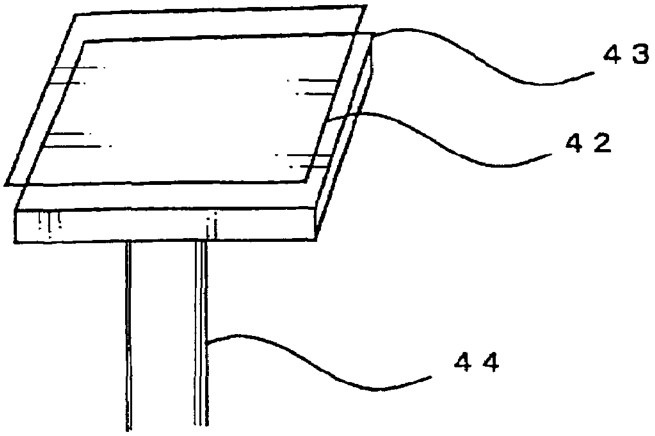
FIG. 4 is a schematic view showing a schematic structure of a sensor using silicon blue cells.

The sensor 4, as shown in FIG. 4, can be easily realized by equipping a silicon blue chip 43 with a color filter 42, which is necessary. Note that, 44 is an output terminal. The sensor may be attached externally to the LCD, as shown by sensor 51 in FIG. 5, or assembled in pixels of the LCD, as described in FIG. 6.

Figure 5:
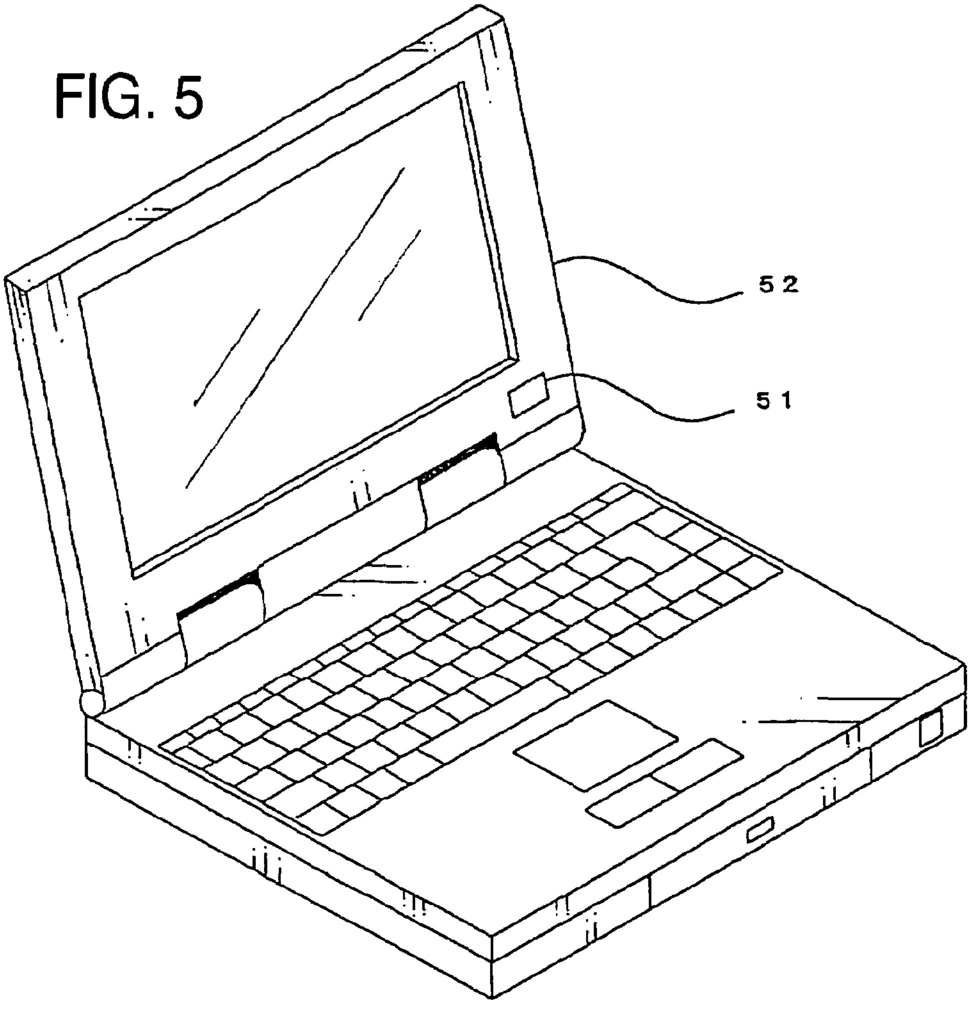
FIG. 5 is an explanatory view illustrating a situation where the sensor is installed on an LCD.
Figure 6:
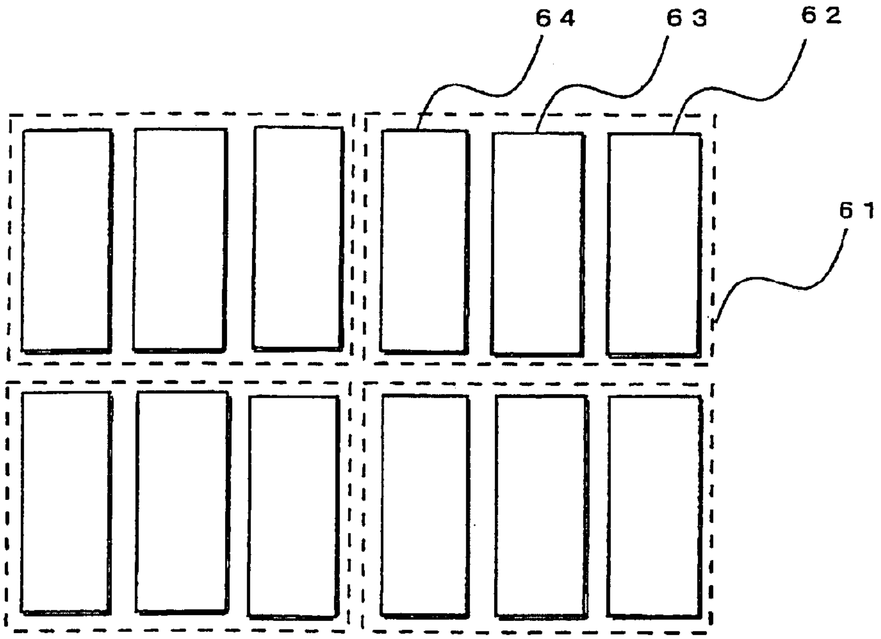
FIG. 6 is an explanatory view showing a situation where the sensor is assembled in an LCD.

In FIG. 5, the sensor is denoted as 51, a PC equipped with an LCD is called 52. Meanwhile, in FIG. 6, pixels of an LCD are numbered 61, and red dots, blue dots, and green dots are referred to as 62, 63, and 64, respectively. The dots 62 to 64 are dots in which sensors are assembled, and the pixels 61 do not participate in the image display. Thus, the pixels 61 are deposed on the margins of the image regions.

In either of the cases, the wavelength regions to resolve may be, for example, wavelength regions corresponding to the RGB, or wavelength regions corresponding to cyan, magenta and yellow (hereinafter, referred to as C, M, Y, respectively). Further, the wavelength regions may be wavelength regions in which visible light range is sampled at an adequate interval, for example, every 100 nm, and intensity of the light in the region is outputted.

By the way, a sensor of the kind installed as shown in FIG. 5, for example, should be able to detect light that is peripheral light and actually reaches the eyes of a user after reflection by the liquid crystal in the liquid crystal display panel. Detection of peripheral light striking onto the liquid crystal, but not reaching to the eyes, is not necessary.

Figure 25:
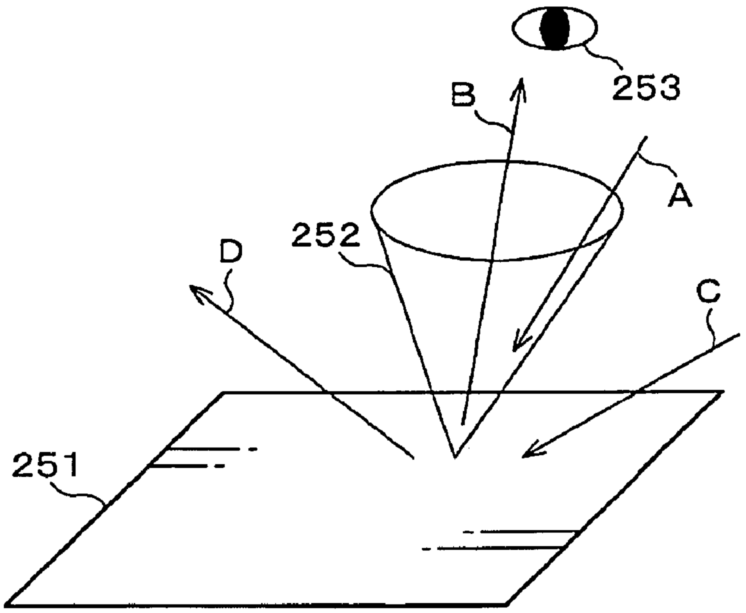
FIG. 25 is an explanatory view showing an example of light reflection of reflection type liquid crystal.

FIG. 25 shows an example of light reflection of the reflection type LCD. Here, a reflection type liquid crystal panel is numbered 251. Light, which comes through the range of a circular cone 252 and strikes onto the reflection type liquid crystal panel 251, is reflected substantially frontward of the reflection type liquid crystal panel 251 effectively, and recognized as light by an eye 253 of a user. On the other hand, light with another incident angle is substantially regularly reflected, but out of the circular cone 252, by the reflection type liquid crystal 251, so that the eye 253 of the user can not sense the light. For example, light coming from a direction shown by an arrow A is sensed by the eye 253 of the user via a course indicated by an arrow B, while light coming from a direction illustrated by an arrow C is reflected to a direction indicated by an arrow D, without being sensed by the eye 253 of the user.

The effective reflection range of incident light shown by the circular cone 252 is determined depending on the type of the reflection type liquid crystal which is employed.

Hence, the sensor is given sensitivity distribution characteristics which are same as the circular cone 252. This makes it possible for the sensor to detect effectively the type of light which is reflected by the reflection type liquid crystal panel 251 and actually sensed by the eye 253 of the user. Other light, which is not reflected by the liquid crystal, is not detected by the sensor, so that the sensor does not evaluate the light which cannot actually reach the eye 253 of the user.

This has such an advantage that only light which actually reaches the eye 253 of the user can be utilized in the system.

The sensor outputs, from the output terminal 44, shown in FIG. 4, and the like, a signal equivalent to the wavelength characteristics of the illumination light. The signal is utilized for determining the matrix required by the target display color setting section 6 or the color reproduction section 7.

As discussed above, in the present invention, by using the two matrices, the inputted signal is converted based on the characteristics of the illumination light obtained by the sensor 4. Then, the corresponding color, which is suitable for human viewing and adapted to the illumination condition is determined. The corresponding color is displayed by using the three primary colors under the influence of the illumination. This presents colors agreeable with the condition to which the vision system of the user is adapted. This has an advantage that color balance sensed by the user is improved. Without this advantage, viewing a display with colors disagreeable with the adaptation condition of the vision system imposes an unnecessary burden to the vision system, thus causing eyestrain. The present invention, in which an image is displayed considering the adaptation condition, can provide an image that does not impose the burden to eyes, thus which is a natural and eyestrain-free image.

It should be noted that the color reproduction section 7 gives better effect when it is used in the reflection type LCD, where the display is carried out with illumination light from peripheral light sources, compared with when used in the transmission type LCD, in which the display is performed with the light from the back light. The reason is because the transmission type LCD shows a little change in chromaticities of the three primary colors as the illumination light is changed, while the change of the chromaticities of the three primary colors is eminent with the change of the illumination light, in the case of the reflection LCD. In the reflection type LCD, the change of the three primary colors is more significant than the residual error of the adaptation, thus a great effect can be expected, even when only the color reproduction section 7, which corrects the color change, is used.

On the other hand, in the transmission type LCD, satisfactory utility can be achieved only by correcting the human chromatic adaptation characteristics by using the target display color setting section 6, even without using the color reproduction section 7, in the chrominance signal converter.

Figure 7:
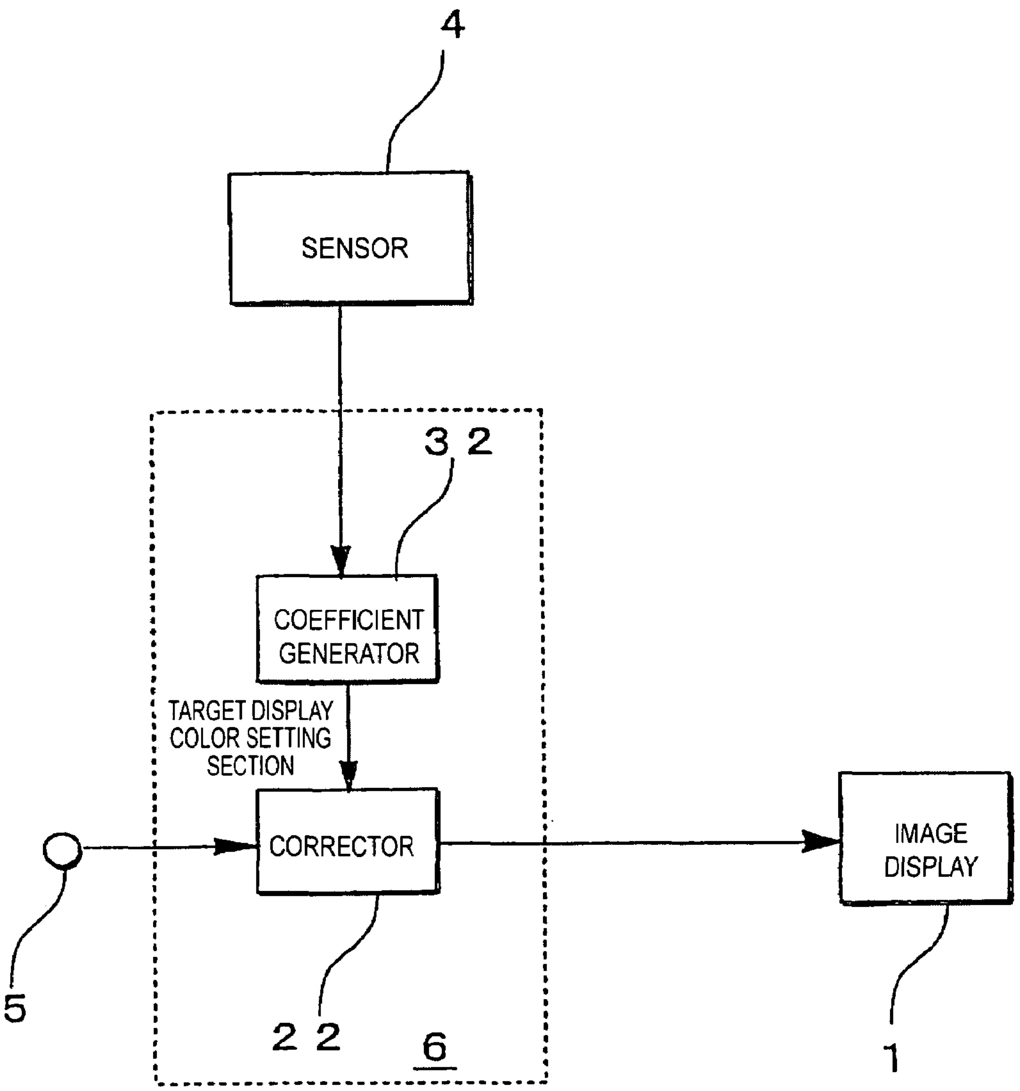
FIG. 7 is a schematic view showing a schematic structure of another example of an image display device of the present invention.
Figure 8:
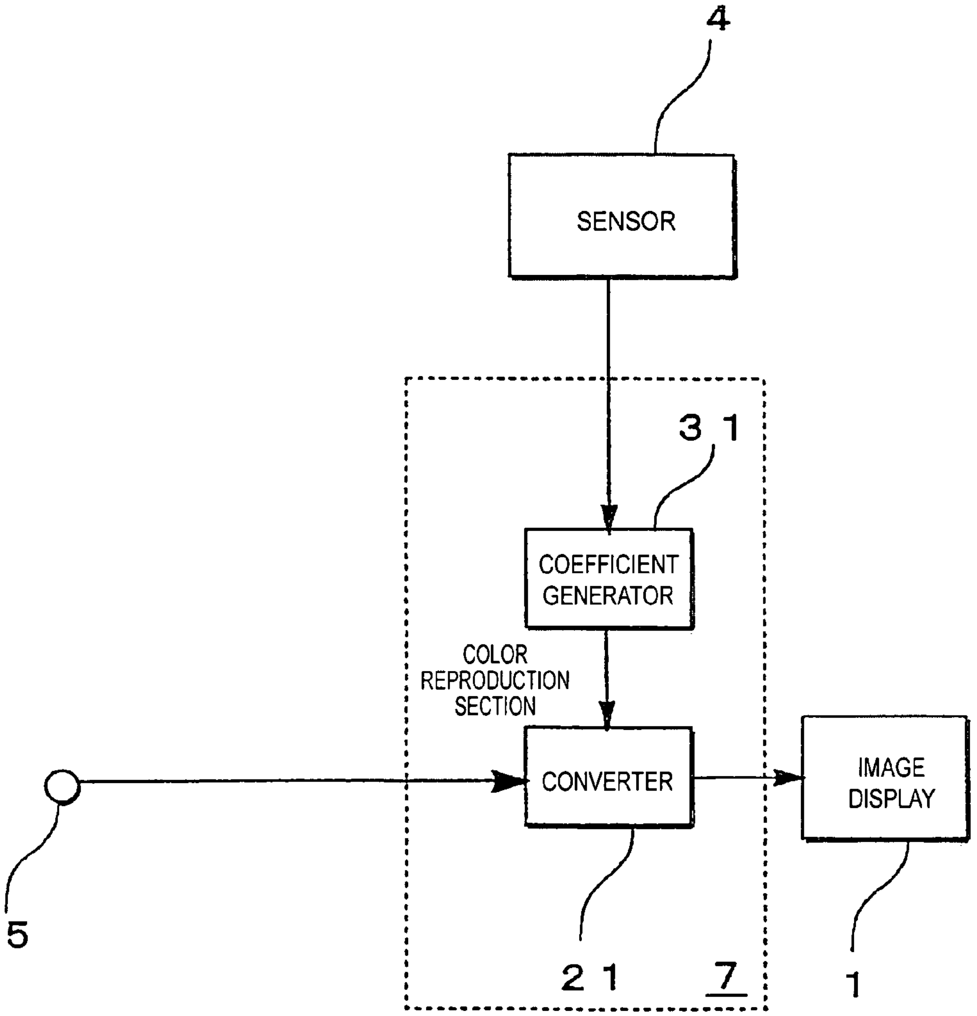
FIG. 8 is a schematic view showing a schematic structure of still another example of an image display device of the present invention.

Block diagrams of other arrangements are shown in FIGS. 7 and 8. In FIGS. 7 and 8, the same numbers as in FIG. 1 are given to corresponding sections. Needless to say, either of display devices can have far better color display by using both the target display color setting section 6 and the color reproduction section 7.

The preferred arrangement shown is in FIG. 1. In FIG. 1, the sensor 4 senses the light characteristics of the illumination light, and the color to display the output of the sensor 4 is set by the target display color setting section 6. The target display color that has been set as such is introduced into the color reproduction section 7, which renders a display by using the three primary colors having arbitrary chromaticities, so as to find the color conversion matrices (the color conversion coefficients) for the respective three primary colors. Subsequently, the matrix calculations are executed twice in sequence according to the signal inputted into the signal input terminal 5, thereby accomplishing this function. In the arrangements shown in FIGS. 7 and 8, the arrangements are so simplified that the matrix calculation is carried out only once.

In other words, for an image display device shown in FIG. 7, only a target display color setting section 6 is provided as a chrominance signal converter. In this chrominance signal converter, a target display color setting matrix, which is suitable with the output of a sensor 4, is generated by a target display color setting matrix generator 32 at the target display color setting section 6, and a signal (a chrominance signal) transmitted from a signal input terminal 5 is converted by a target display color correction section 22, based on the target display color setting matrix.

Moreover, in an image display device shown in FIG. 8, only a color reproduction section 7 is provided as a chrominance signal converter. In this chrominance signal converter, a color reproduction matrix, which is suitable with the output of the sensor 4, is generated by a color reproduction matrix generator 31 at the color reproduction section 7. A signal (a chrominance signal) transmitted from a signal input terminal 5 is converted by a color converter 21, based on the color reproduction matrix.

In the present embodiment, the transmission type LCD and the reflection type LCD are given as examples for explanation. However, the invention is not limited to these, and it may be employed generally for display devices, for example, Cathode Ray Tube (CRT) display devices, Electroluminescence (EL) display devices, and a plasma display devices. Moreover, it may be widely applied for electronic apparatuses equipped with those image display devices, such as a notebook-sized PC, a desk-top PC, a monitor, a projection television, a direct vision television, a video camera, still camera.

[Second Embodiment]

Another Embodiment of the present invention involves correcting a chrominance signal without using a sensor.

Simple identification of the tristimulus values of the illumination light is possible when types of common illumination and their tristimulus values are stored in advance and the illumination condition at the time is selected by a user. For simple equalization of colors, it is easier to store chromaticity coordinates values of the illumination light, rather than to store the tristimulus values. It is explicit that this kind of arrangement can be opted, too.

Figure 9:
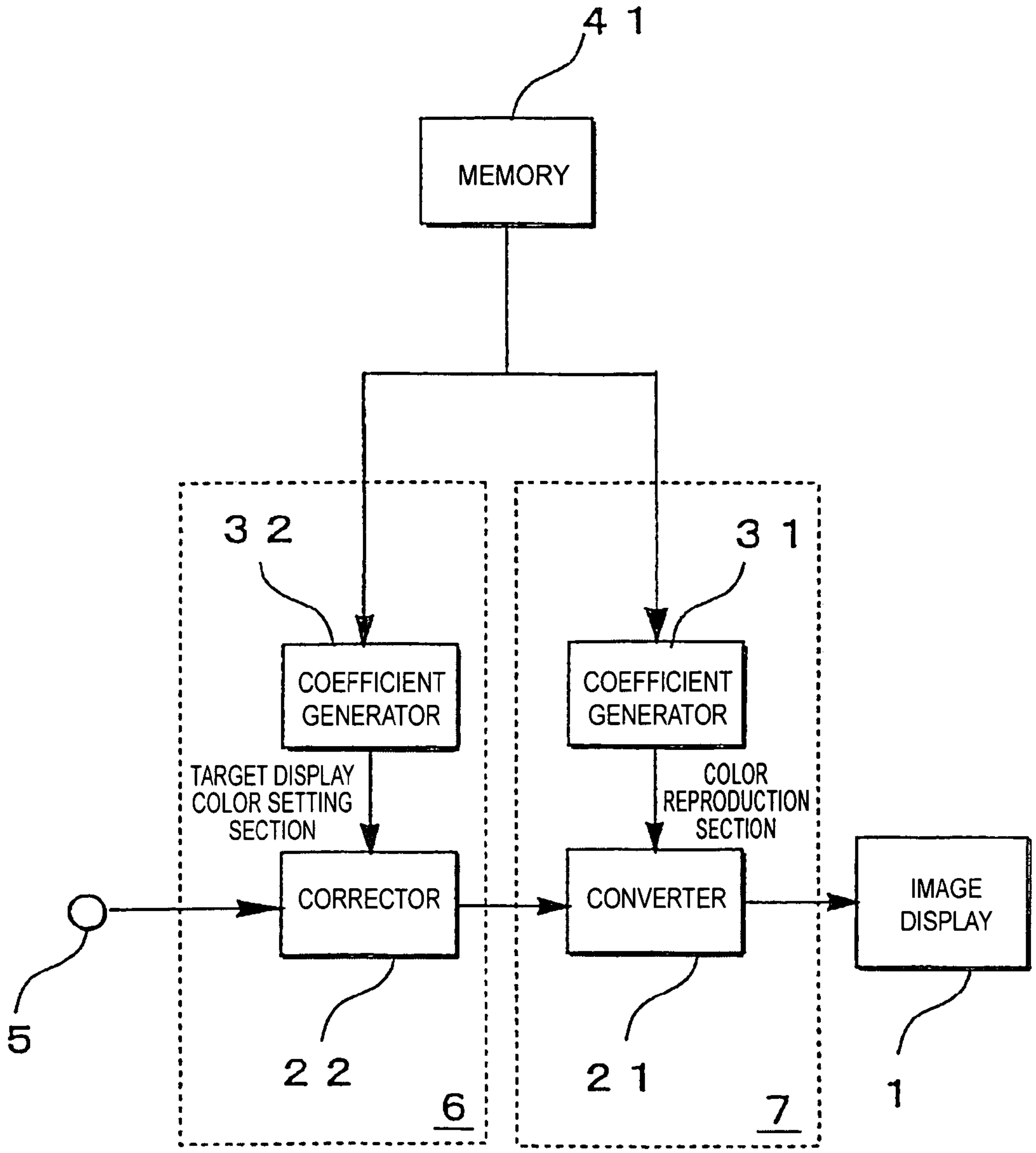
FIG. 9 is a schematic view showing a schematic structure of yet another example of an image display device of the present invention.

In order to realize the above processes, an LCD of the present embodiment, as shown in FIG. 9, is provided with a memory 41, which stores in advance the characteristics of the illumination light determined by the sensor 4 discussed in the first embodiment. The information stored in the memory 41 is fetched by a user via a relevant interface (not shown) at anytime and as necessary.

In the LCD with the arrangement of FIG. 9, wavelength characteristics of the illumination light is stored in the memory 41. The user selects a keyword, such as a fluorescent lamp, an electric lamp, or outdoors, so that wavelength characteristics in accordance with the selection are outputted.

Figure 10:
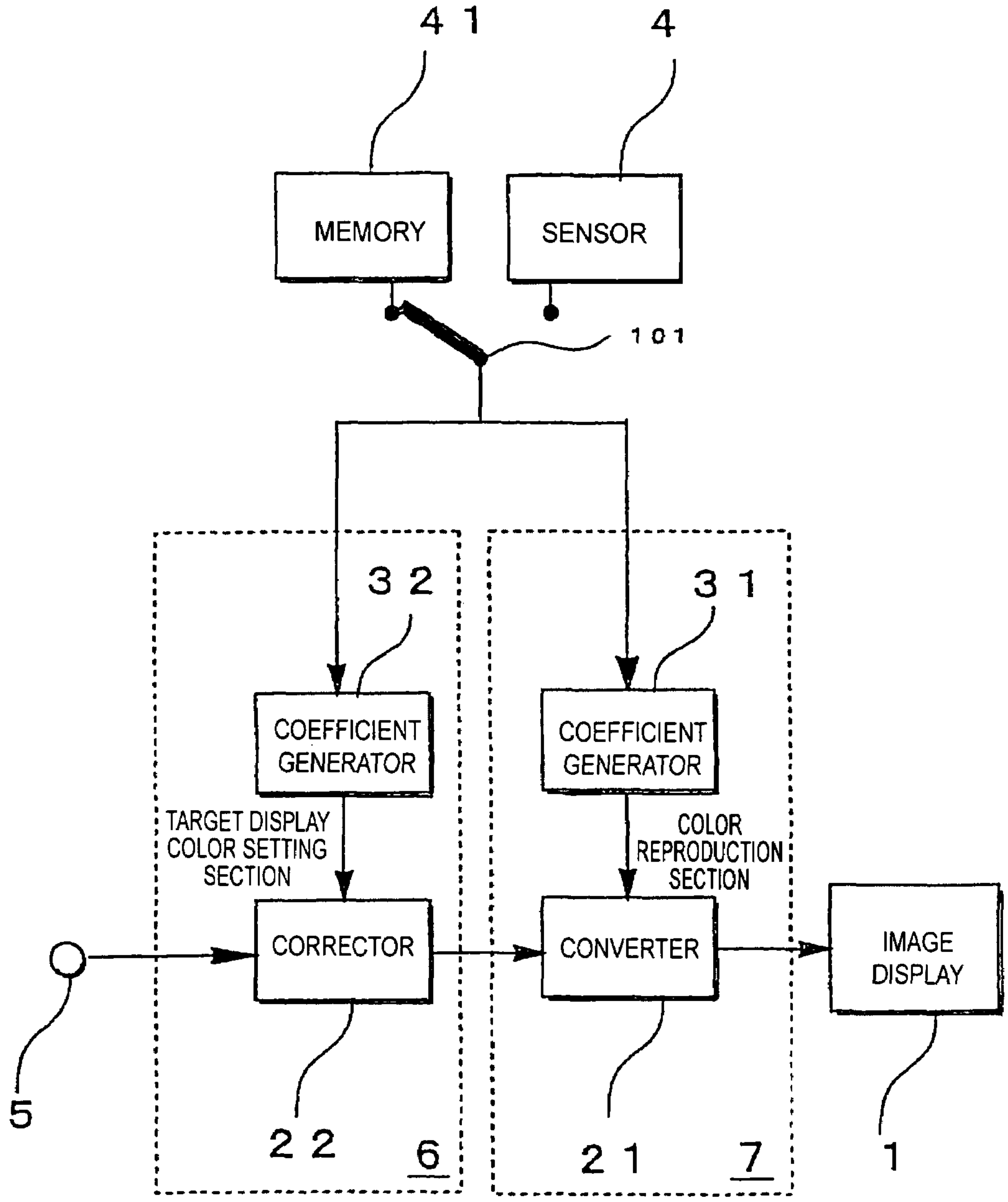
FIG. 10 is a schematic view showing a schematic structure of yet still another example of an image display device of the present invention.

Moreover, as shown in FIG. 10, a sensor 4 may also be used so that output of the sensor 4 and the output of the memory 41 can be used alternatively, as needed. The switchover of the outputs is conveniently performed by using a switchover switch 101. The output of the memory 41 may be used when the device is regularly used in an office, while the output of the sensor 4 may be applied when the device is used outdoors under a condition where the illumination condition varies from time to time.

Figure 11:
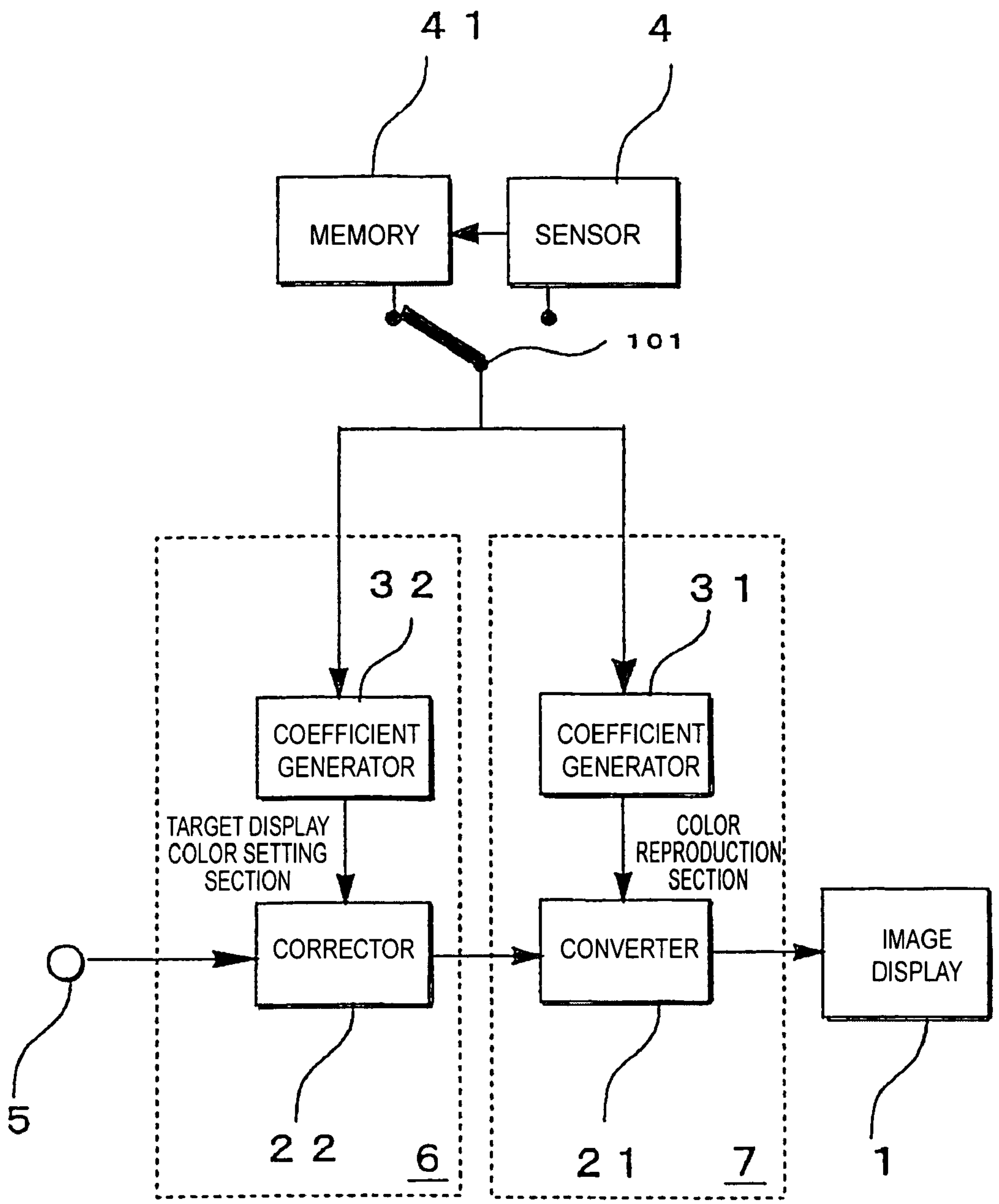
FIG. 11 is a schematic view showing a schematic structure of a further example of an image display device of the present invention.

Further, as shown in FIG. 11, the output of the sensor 4 may be additionally written in the memory 41. In this case, it is possible to add wavelength characteristics data in accordance with an environment, where the device is used, and which is required by the user, in order to attain much greater usefulness.

Figure 12:
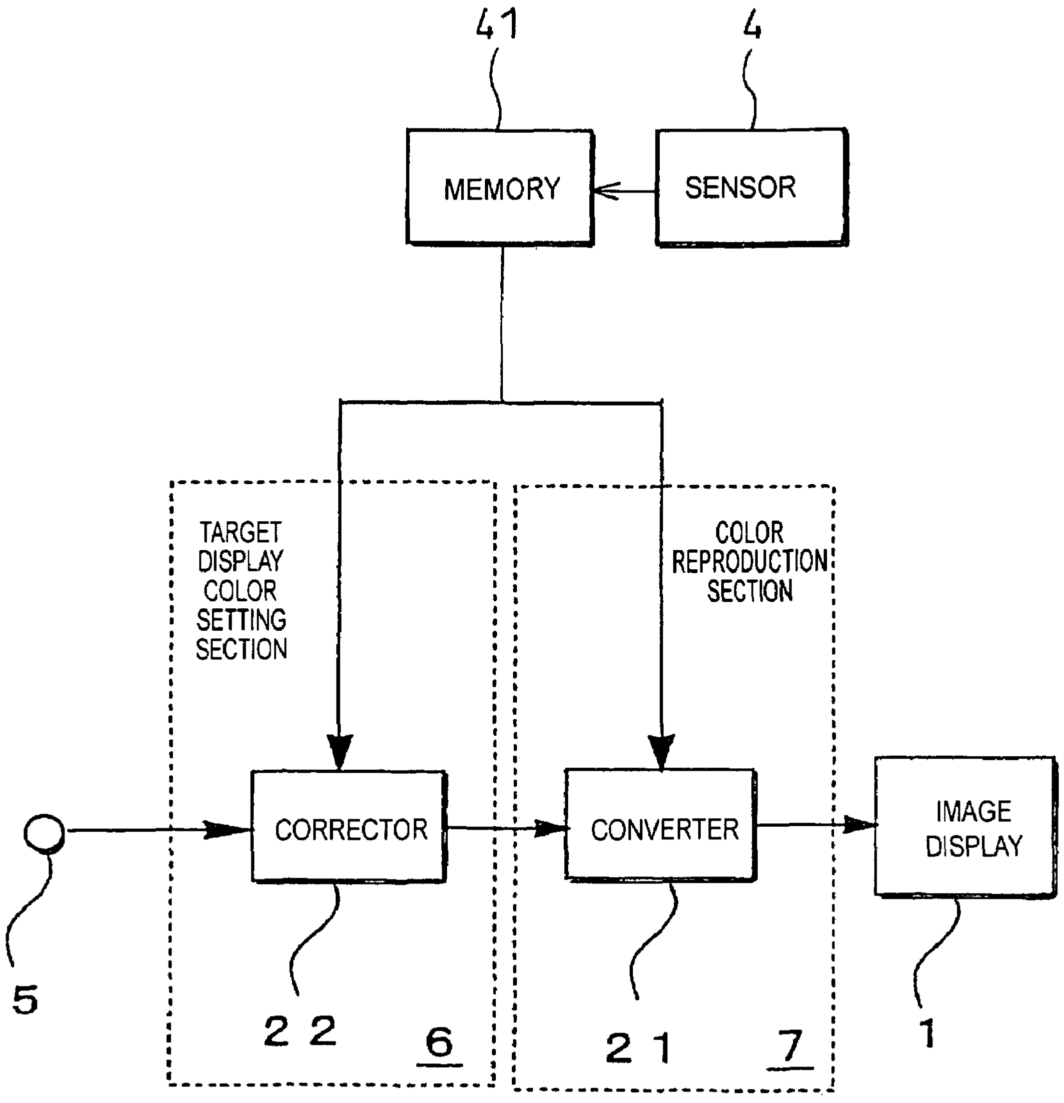
FIG. 12 is a schematic view showing a schematic structure of a still further example of an image display device of the present invention.

Furthermore, as shown in FIG. 12, matrices required for calculations may be directly written directly in the memory 41, besides the wavelength characteristics of the illumination light, which is the external light condition detected by the sensor 41. In an arrangement shown in FIG. 12, stored in the memory 41 are a matrix necessary for a target display color correction section 22 of a target display color setting section 6, and a matrix needed by a color converter 21 of a color reproduction section 7. Therefore, two sets of the wavelength characteristics of the illumination light as the external light conditions are installed in the memory 41, one corresponding set for each of the target display color correction section 22 and the color converter 21, together with two sets of the matrices, one corresponding set for each of the sections. Further, the external light conditions and the matrices stored in the memory 41 are outputted in a set-by-set manner when they are needed.

In this case, besides installation of matrices corresponding to several typical types of illumination light in the memory 41 at the time of shipping, it is possible to add in the memory 41 a matrix in accordance with the environment, where the device is used, and which is required by the user, just as discussed in FIG. 11 in terms of the arrangement of FIG. 12.

[Third Embodiment]

Figure 13:
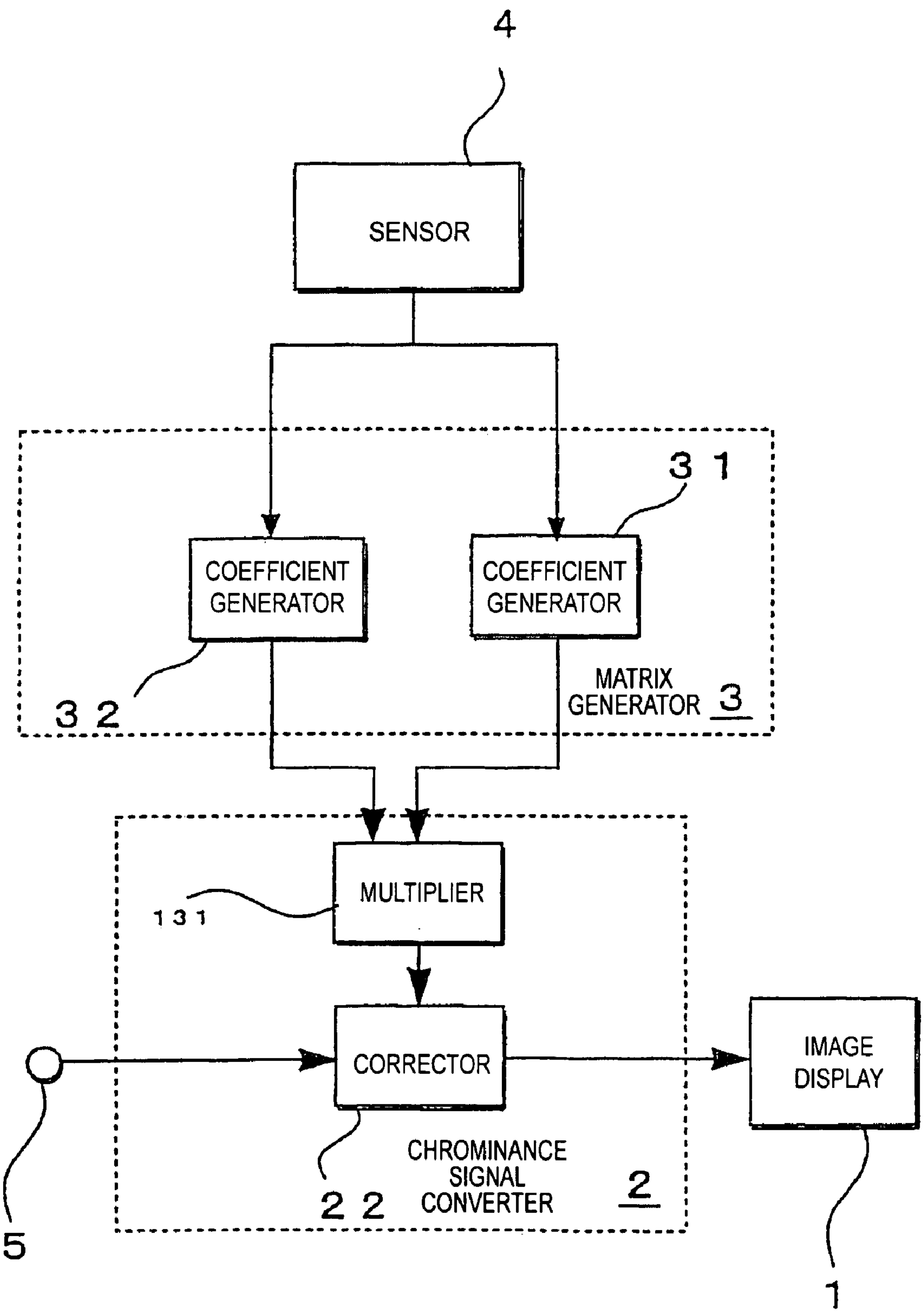
FIG. 13 is a schematic view showing a schematic structure of a yet further example of an image display device of the present invention.

In the third embodiment, as in the first embodiment, two matrix calculations are carried out consequently, and two matrices necessary for calculations are determined in advance. FIG. 13 shows an example of an arrangement of an LCD of the third embodiment.

The LCD shown in FIG. 13 is provided with a matrix generator 3 and a calculation section (color correction section) 2 as a chrominance signal converter. The matrix generator 3 calculates two matrices in accordance with an output of a sensor 4, while products of the matrices are determined in advance by a multiplier 131 and an RGB signal of a chrominance signal is multiplied by the products by a target display color correction section 22 in the calculation section 2. Conventionally, it was necessary to execute color conversion calculations on a regular basis while an image was displayed. However, in the present way, matrix calculations, which were conventionally necessary to be carried out twice on a regular basis, can be accomplished only one time. Thus, throughout the entire device is improved.

Figure 14:
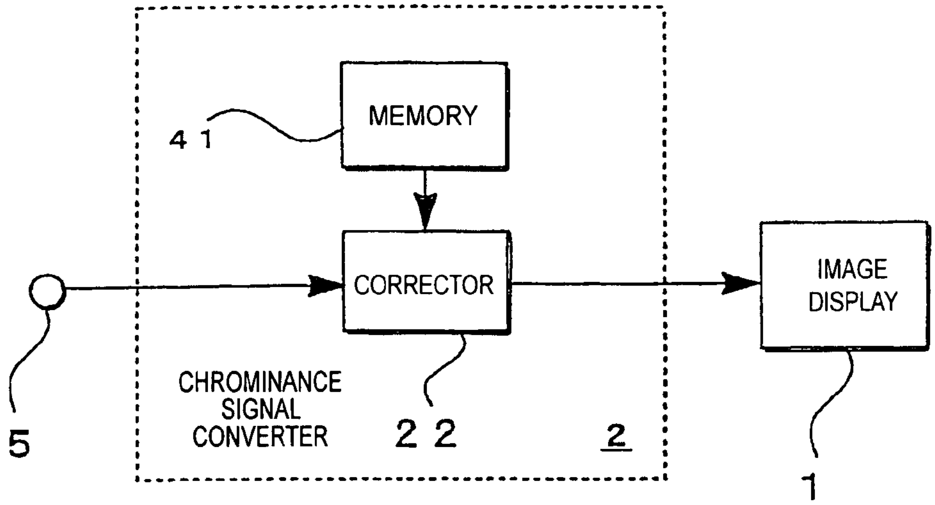
FIG. 14 is a schematic view showing a schematic structure of a yet still further example of an image display device of the present invention.
Figure 15:
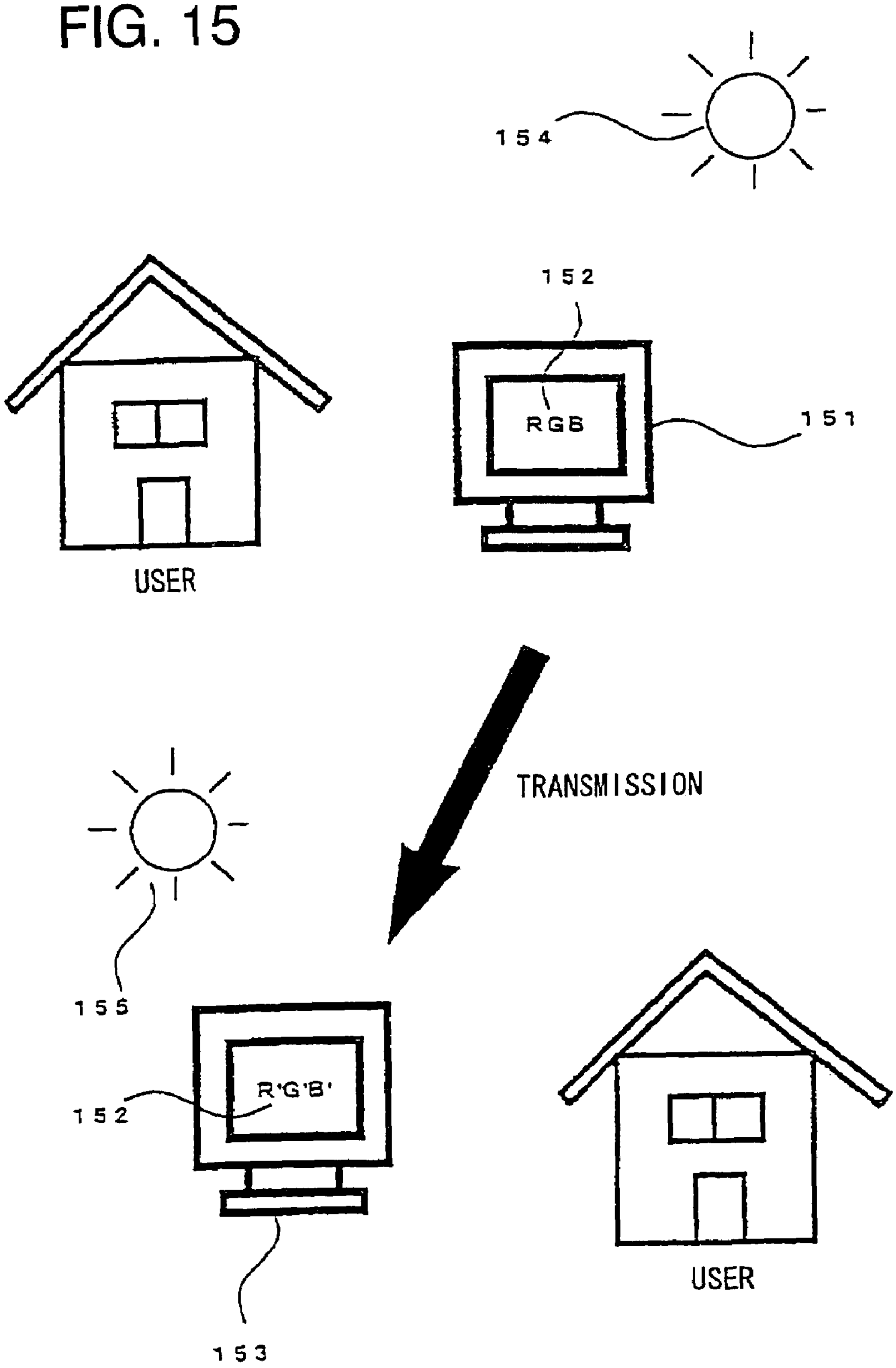
FIG. 15 is an explanatory view illustrating problems of a conventional technology.
Figure 16:
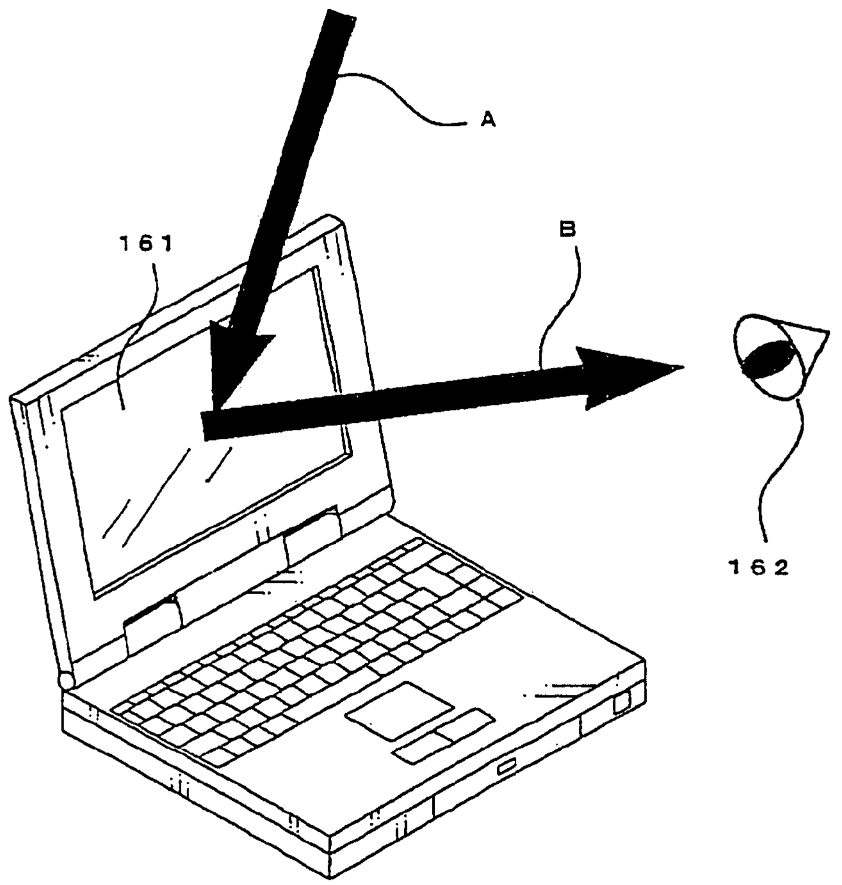
FIG. 16 is an explanatory view in regard of color expression of the reflection type LCD.
Figure 17A:
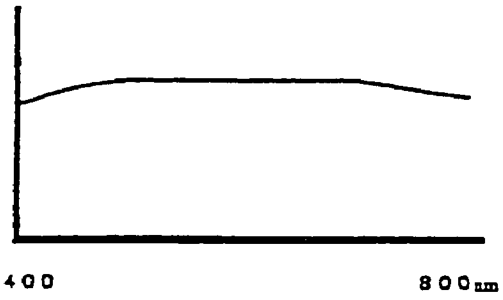
FIGS. 17A–17E are explanatory views showing a color change of the reflection type LCD.
Figure 17B:
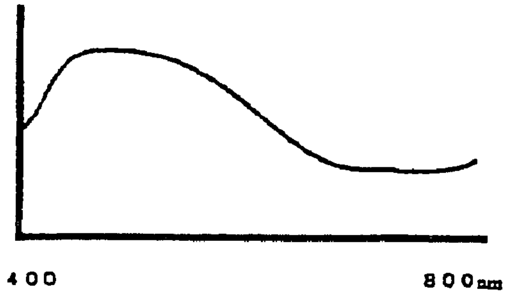
Figure 17C:
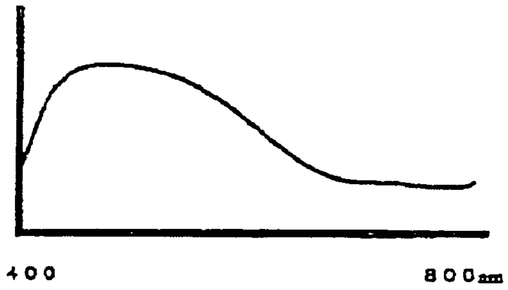
Figure 17D:
Figure 17E:
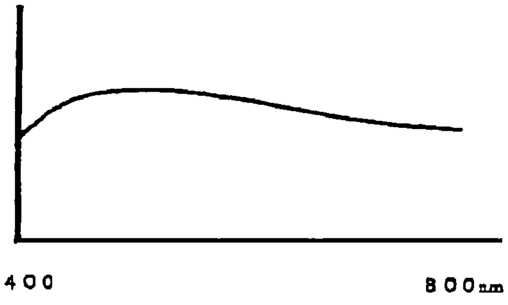
Figure 18:
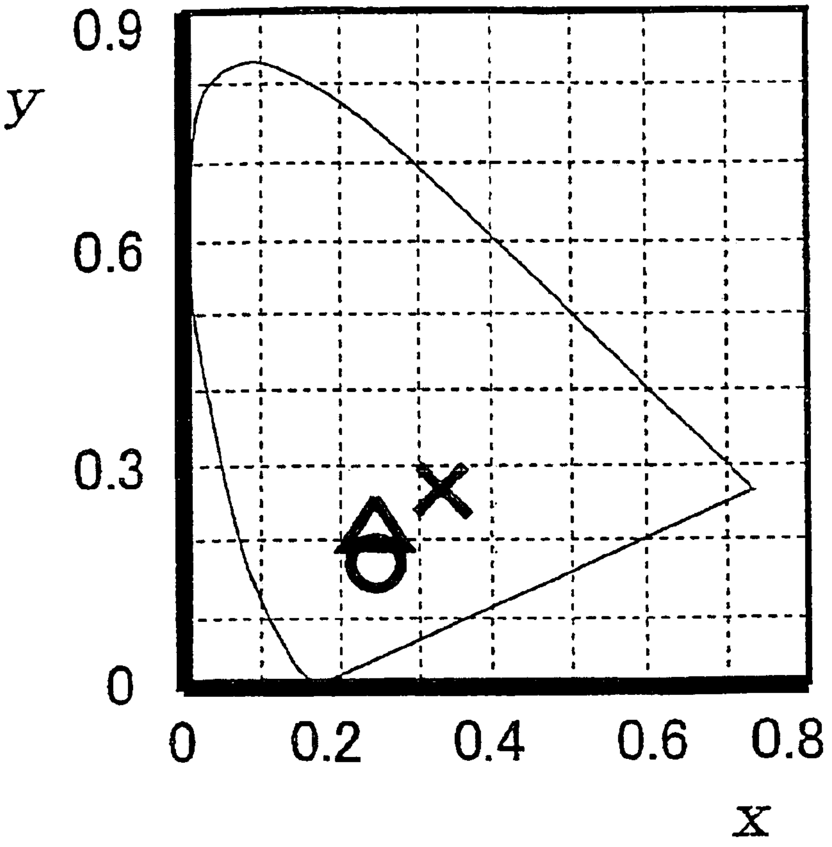
FIG. 18 is a graph explaining a color gamut of the reflection type LCD.

In the third embodiment, it is not necessary to have two sections for finding the matrices, as the two sections can be integrated into one section. Moreover, the sensor 4 shown in FIG. 13 can be replaced with the memory 41 discussed in the second embodiment, arrangement as shown in FIG. 14. In the cases of the devices shown in FIGS. 13 and 14, the arrangements are simplified with appealing utility to users. Especially for the image display device shown in FIG. 14, where the memory 41 and the target display color correction section 22 are included in an interior of the chrominance signal converter 2, it is possible to store the necessary matrices in the memory 41, thus the device can have a significantly simple arrangement.

[Fourth Embodiment]

A fourth embodiment a method of judging whether an LCD is located indoors or outdoors (indoor/outdoor judgement).

In the first embodiment, the matrices are determined in accordance with the light characteristics of the external light detected by the sensor 4. At least two or more sensors 4 are employed for this purpose, but it is possible to structure the system with only one sensor 4.

In general, a reflection type display device can be used with no problem in a very bright place where an ordinary flat panel display device cannot be used, such as outdoors with direct sunlight. In an outdoor environment, compared to an indoor environment, significantly large tube surface illuminance is obtained. Therefore, it is possible to judge whether or not the device is being used in the outdoor environment by measuring the illuminance by using the sensor 4 (shown in FIG. 5) for judging whether the illuminance is significantly large. In other words, use of a single sensor can judge whether the device is in the outdoor environment or in the indoor environment. Hence, when it is judged that the device is in the outdoor environment, the correction system can be utilized, by employing the method of the second environment, supposing sunlight illumination is given.

This simplifies the sensor, and, at the same time, provides a highly practical and effective system, by utilizing most remarkable characteristics of the reflection type display, that is, utility in a very bright environment. Indoor/outdoor judgment is especially helpful when the device is used in a vehicle, where it is necessary to deal with a wide range of illumination conditions. For example, in a vehicle, conditions may vary from a very bright environment to an environment similar to the indoor environment, or an environment of night driving. The indoor/outdoor judgment makes it possible to provide a display suitable for the respective situations, for example, by switching on a supplementary illumination light during night driving, and judging the very bright environment as a condition with direct sunlight striking onto the display.

In order to solve the above problems, an image display device of the present invention, in order to solve the above problems, includes an image display section for displaying an image in accordance with an input of a chrominance signal, and a chrominance signal converter for converting the chrominance signal to be inputted into the image display section, in accordance with light characteristics of external light that strikes onto the image display section.

The external light does not indicates a back light installed in an interior of the image display section, but denotes light from a light source locating in an exterior of the image display section, such as sunlight and a fluorescent lamp. In general, when an image displayed on the image display section is viewed by a user, the tint of the image appears to be varied, depending on types of the external light striking the image display section. Hence, the chrominance signal, which is to be inputted into the image display section, may be corrected for every type of external light, in order that the image, which looks differently for every type of the external light, appears with a consistent similar tint.

Moreover, the types of external light can be identified by detecting the light characteristics of the external light. Typical light characteristics are wavelength characteristics that can be used for an easy identification of the external light.

Accordingly, the above arrangement, where the image is displayed with the chrominance signal converted in accordance with the light characteristics of the external light, can provide an image with color tone, in which no change is sensed by the user, even when the light characteristics of the external light, in other words, the types of the light source are varied.

It is also possible to provide a sensor for sensing the light characteristics of the external light, while the chrominance signal converter may convert the chrominance signal into a chrominance signal of a color suitable for an output of the sensor.

In this case, the identification of the external light can be carried out with ease by detecting the light characteristics of the external light by the sensor. Further, by arranging that the chrominance signal to be inputted into the image display section is converted into the chrominance signal of a color suitable for the output of the sensor, an image in accordance with the light characteristics of the external light, that is, the image with the color tone, in which no change is sensed by the user.

The chrominance signal converter may include a target display color setting section for setting a color to display as an image agreeable with chromatic adaptation characteristics of human, according to the output of the sensor, and the chrominance signal converter may convert the chrominance signal into a chrominance signal of a target display color that has been set by the target display color setting section.

In this case, in the chrominance signal converter, set by the target display color setting section is the color to display, in accordance with the light characteristics (the wavelength characteristics) of the external light detected by the sensor, and in consideration of the adaptation of the human vision system to the external light. The chrominance signal to be inputted into the image display section is converted into the chrominance signal of the color set as such. Therefore, a chrominance signal of the color, which is set in consideration of the adaptation to the external light, that is, the chromatic adaptation characteristics of human, is inputted into the image display section. Thus, the image displayed as such can be the image with the color tone, in which no change is sensed by the user.

The above arrangement is effective, in the case where the human chromatic adaptation characteristics are more influential than the chromaticities of the three primary colors, such as in the case of the transmission type image display device.

Moreover, the chrominance signal converter may include a color reproduction section for reproducing a right color by using three primary colors having chromaticities suitable for the output of the sensor. The chrominance signal converter may convert the chrominance signal into a chrominance signal of a color reproduced by the color reproduction section.

In this case, in the chrominance signal converter, the color reproduction section reproduces the right color by using the three primary colors having the chromaticities suitable for the output of the sensor, while the chrominance signal to be inputted into the image display section is converted into the chrominance signal of the reproduced right color. Therefore, the image display section can always display an image in the right color even when the light characteristics of the external light are changed.

The above arrangement considers the change with the chromaticities of the three primary colors that are changed depending on the external light. Thus, the above arrangement is effective especially in the case that the change in the three primary colors gives a huge impact on the image display, such as in the case of the reflection type display device in which the display is carried out with the illumination light from the peripheral light sources.

Furthermore, the chrominance signal converter may include (1) a target display color setting section for setting a color to display as an image agreeable with chromatic adaptation characteristics of human, according to the output of the sensor, and (2) a color reproduction section for reproducing a target display color that has been set by the target display color setting section, by using three primary colors having chromaticities suitable for the output of the sensor. The chrominance signal converter may convert the chrominance signal into a chrominance signal of a target display color reproduced by the color reproduction section.

In this case, in the chrominance signal converter, the target display color setting section sets the color to display as the image agreeable with the chromatic adaptation characteristics of human, according to the output of the sensor, while the color reproduction section reproduces the target display color that has been set by the target display color setting section, by using the three primary colors having the chromaticities suitable for the output of the sensor. Thus, the chrominance signal to be inputted into the image display section is converted into the chrominance signal in the target display color reproduced in this manner. As a result, it is possible to display an image in consideration of the chromatic adaptation characteristics of human. Further, the image has no change in the color tone to be sensed by the user, and is displayed always in the right color even when the light characteristics of the external light are changed.

This provides an image always in a color suitable for the user, while not affected by the light characteristics of the external light.

Furthermore, the chrominance signal converter may include (1) a color correction coefficient generator for generating color correction coefficient, in accordance with the output of the sensor, and (2) color correction section for correcting the chrominance signal by using the color correction coefficient generated by the color correction coefficient generator.

In this case, in the chrominance signal converter, the chrominance signal is corrected by using the color correction coefficient, in accordance with the light characteristics of the external light. Therefore, the image in accordance with the light characteristics of the external light is displayed on the image display section.

This provides the image with the color tone, in which no change is sensed by the user, while not affected by the light characteristics of the external light.

Specifically, the color correction coefficient generator may include (1) a target display color setting coefficient generator for generating a target display color setting coefficient, which is used for setting a target display color, and (2) a color reproduction coefficient generator for generating a color reproduction coefficient used for color reproduction, based on the output of the sensor. The color correction section may include (1) a multiplier for calculating a product of (a) the target display color setting coefficient generated by the target display color setting coefficient generator, and (b) the color reproduction coefficient, and (2) a target display color correction section for performing color correction of a chrominance signal, based on a value obtained by the multiplier.

In this case, the target display color setting coefficient generator generates the target display color setting coefficient for the multiplier to use, while the color reproduction coefficient generator generates the color correction coefficient for the multiplier to use. The multiplier determines the product of the target display color setting coefficient and color reproduction coefficient which are generated based on the light characteristics of the external light. The target display color correction section carries out the color correction of the chrominance signal, based on the value obtained by the multiplier, before the signal is inputted into the image display section.

As described above, because the color correction of the chrominance signal before being inputted into the image display section, in accordance with the light characteristics of the external light, it is possible to display the image with the color tone, in which no change is sensed by the user, even when the light characteristics of the external light are changed.

Moreover, examination of the wavelength characteristics, which are one of the light characteristics of the external light, can identify the types of the light, which is striking onto the image display section, or the types of the peripheral light. This identification of the types of the light can roughly identify the environment in which the image display device is placed.

Therefore, in order to detect the wavelength characteristics of the external light, the external light may be resolved into more than two wavelength regions by the sensor, and the wavelength characteristics, which is one of the light characteristics of the external light, are measured by grasping the intensities of the respective regions.

Specifically, the sensor may have a function to resolve wavelength characteristics into at least two different types of wavelength regions, and may measure wavelength characteristics of the external light, based on output values in the respective wavelength regions.

Another image display device of the present invention, in order to solve the problems, is provided with a memory for storing in advance the light characteristics of a plurality of types of the external light, while the chrominance signal converter converts the chrominance signal into a chrominance signal of a color suitable for the light characteristics of the external light that are selected and read out from the memory.

In the above arrangement, the chrominance signal before being inputted into the image display section is corrected based on the light characteristics of the external light selected from among the light characteristics of the external light that are stored in the memory. Therefore, the image is displayed by the chrominance signal suitable for the selected light characteristics of the external light.

It is possible to give the user alternative selections of light characteristics of the external light suitable for the environment, where the device is used, by storing, as the light characteristics of a plurality of the types of the external light, the light characteristics of, for example, the indoor illumination, outdoor sunlight, and the like, which are the external light expected to illuminate the image that is viewed by the user. Furthermore, it is possible to display the image in the right color under those types of the external light, that is, in the color with the color tone, in which no change is sensed by the user.

The memory may store wavelength characteristics of more than two types of wavelength regions of the external light, and may output the wavelength characteristics as the selected light characteristics of the external light, in accordance with a combination of the stored wavelength characteristics.

In this case, to store the wavelength characteristics of the more than two types of the wavelength regions of the external light is equivalent to storing the light characteristics of various types of the external light. Thus the storage capacity of the memory is reduced, while dealt are the types of the light characteristics of the external light, as many as the number of the combinations of the stored wavelength characteristics.

The chrominance signal converter may include a target display color setting section for setting a color to display as an image agreeable with chromatic adaptation characteristics of human, based on the light characteristics of the external light selected from the memory. The chrominance signal converter may convert the chrominance signal into a chrominance signal of a target display color that has been set by the target display color setting section.

In this case, in the chrominance signal converter, the target display color setting section sets the color to displayed in consideration of the adaptation of the human vision system to the external light, and in accordance with the light characteristics (the wavelength characteristics) of the external light detected by the sensor, and converts the chrominance signal to be inputted into the image display section into the chrominance signal of the color set as such. Therefore, the image display section receives the chrominance signal of the color that has been set in consideration of the adaptation to the external light, in other words, in consideration of the chromatic adaptation characteristics of human. Thus, the image display in the manner is an image with the color tone, in which no change is sensed by the user.

The above arrangement is effective in the case where the effect of the chromatic adaptation characteristics of human is more significant than the effect of the chromaticities of the three primary colors, such as in the case of the reflection type image display device.

Furthermore, the chrominance signal converter may include a color reproduction section for reproducing a color to display as an image agreeable with chromatic adaptation characteristics of human, by using three primary colors having chromaticities suitable for the light characteristics of the external light selected from the memory. The chrominance signal converter may convert the chrominance signal into a chrominance signal of a color reproduced by the color reproduction section.

In this case, in the chrominance signal converter, the color reproduction section reproduces the right color by using the three primary colors having the chromaticities suitable for the output of the sensor. The chrominance signal to be inputted into the image display section is converted into the chrominance signal of the reproduced right color. Therefore, the image is displayed always in the right color, even if the light characteristics of the external light are changed.

The above arrangement, in which considered are the changes in the chromaticities of the three primary colors that are changed depending on the external light, is effective in the case where the effect of the change in the three primary colors is significant, especially in case of the reflection type display device in which the display is carried out by the illumination light from the peripheral light sources.

Further, the chrominance signal converter may include (1) a target display color setting section for setting a color to display as an image agreeable with chromatic adaptation characteristics of human, based on the light characteristics of the external light selected from the memory, and (2) a color reproduction section for reproducing a target display color that has been set by the target display color setting section, by using three primary colors having chromaticities suitable for the output of the memory. The chrominance signal converter may convert the chrominance signal into a chrominance signal of the target display color reproduced by the color reproduction section.

In this case, in the chrominance signal converter, the target display color setting section sets the color to display as the image agreeable with the chromatic adaptation characteristics of human, based on the output of the memory. The color reproduction section reproduces the target display color that has been set by the target display color setting section by using the three primary color with the chromaticities suitable for the output of the memory. Then, the chrominance signal to be inputted into the image display section is converted into the chrominance signal of the target display color reproduced as such. Therefore, the image is displayed, in consideration of the chromatic adaptation characteristics of human. Further, the image is displayed with the color tone, in which no change is sensed by the user, and always in the right color even if the light characteristics of the external light are changed.

This provides an image always in the color suitable for the user, while not affected by the light characteristics of the external light.

An image display device of the present invention, in order to solve the above problems, is provided with a sensor for sensing the light characteristics of the external light, while the chrominance signal converter selectively performs (1) conversion of a chrominance signal based on an output of the sensor, or (2) conversion of a chrominance signal based on the light characteristics of the external light selected from the memory.

In the above arrangement, the chrominance signal converter selectively performs the conversion of the chrominance signal based on the output of the sensor, or the conversion of the chorominance signal based on the light characteristics of the external light selected from the memory. This allows the sensor and the memory to be used selectively depending on requirements.

For example, where the image display section is illuminated by the external light of a type not stored in the memory, the sensor can be utilized for identifying the external light, so as to display an image always in the color in accordance with the light characteristics of the external light.

Moreover, the chrominance signal converter may perform the conversion of the chrominance signal based on the light characteristics of the external light selected from the memory, when an illuminance output, which is one of types of the outputs of the sensor, exceeds a certain value.

In this case, it is possible to judge that the external light striking onto the image display section is a type of light with great light intensity, such as sunlight, from the illuminance output of the external light exceeding the certain value. This eliminates the need of the sensor to be provided for detecting whether the environment is an operation environment with very strong light, such as sunlight, striking onto the image display device (for example, in the outdoors), or an operation environment with light as bright as indoor light striking onto the device (for example, in the indoors).

Further, it is assumed that the very bright light, such as the sunlight is striking onto the image display section when the illuminance output exceeds the certain value. Thus, it is possible to attain an image with the color tone, in which no change is sensed by the user, by correcting the chrominance signal based on the light characteristics of the sunlight stored in the memory.

For example, even in the indoors where the light intensity of illumination is great and the illumination is as bright as sunlight, the chrominance signal can be corrected based on the light characteristics of the sunlight, rather than the light characteristics of the external light for the indoors. On the contrary, even in the outdoors where external light striking onto the image display section has low light intensity, for example when the device is used in the outdoors but in a tunnel or at night, the chrominance signal can be corrected based on the light characteristics for the indoors, but not on the light characteristics of the external light of the outdoors.

Regardless of use in the outdoors or the indoors, this allows the chrominance signal to be corrected in accordance with the illuminance of the external light striking onto the image display section. Thus, it is possible to provide an image always in the color suitable for the user, while not affected by the light characteristics of the external light.

Furthermore, the reflection image display device, which has no problem for being used under illumination of very bright external light, needs a supplementary light (such as a back light) when used in dark. Thus, it is possible to display an image suitable for the operation environment (the variations of the light source of the external light) by setting the illuminance as a value for deciding whether or not the supplementary light is required by the reflection type image display device so that the supplementary light is used compulsorily with a judgement that the external light is not strong enough to perform a proper display when the illuminance is lower than the certain value.

The memory may store in advance the light characteristics of a plurality of types of the external light and a plurality of color correction coefficients in accordance with the light characteristics of the external light. Further, the chrominance signal converter may include (1) a color correction coefficient generator for reading out a color correction coefficient stored in the memory, based on the selected light characteristics of the external light, and (2) a color correction section for correcting the chrominance signal by using the color correction coefficient that is read out from the memory by the color correction coefficient generator.

In this case, stored in advance in the memory are the light characteristics of the external light and the color correction coefficients that are necessary for the correction of the chrominance signal in accordance with the light characteristics of the external light, thus eliminating the need of determining the color correction coefficient. This shortens the steps of the correction of the chrominance signal, thus being easily applied to an image display device with high resolution. The reason for the easy application is explained below.

Signal processing time per one pixel of the image display device will be shortened with an increase in number of the pixels in the display screen (thus when the image display device has high resolution), as long as frame frequency (frame rate) of the image display device with high resolution is equal to that of an image display device with lower resolution where real-time image processing is carried out. For example, where the frame frequency is 60 Hx, the signal processing time per one pixel (note that, blanking time is not considered, here) is as follows.

The processing time for resolution of 640×480 is:

$$1/640\times1/480\times1/60\approx54[\text{nS}],$$

while the processing time for resolution of 1024×768 is:

$$1/1024\times1/768\times1/60\approx21[\text{nS}].$$

In other words, there is a proportional relationship between the resolution and the signal processing time of the image display device when the frame frequency is constant. Here, the signal processing time is shorter for the high resolution, compared to the case of the low resolution.

Hence, as discussed above, the easy application to the high-speed signal processing (display in high resolution) can be attained by shortening the steps of the color correction by storing beforehand the light characteristics of the external light, in order to carry out the signal processing in real time.

The image display device of the above arrangement may be provided to an electronic apparatus, such as a PC.

Where the image is displayed on an electronic apparatus, such as a PC, image data are treated as data in a color space, that is a chrominance signal, at the time the image is displayed. Thus, the correction of the chrominance signal can be performed in accordance with the light characteristics of the external light striking onto the image display device. Therefore, for example, when image data is transmitted to another PC via the Internet, a PC to receive the image data can have an image in a color suitable for a user, if the PC is provided with the image display device of the above arrangement, where the chrominance signal of the received image data is corrected in accordance with the light characteristics of the external light striking onto the image display device. As a result, the image display devices of the PCs on the both sides can have agreement in expression of the images displayed on them.

An image display device of the present invention converts a chrominance signal to be inputted into an image display section in accordance with light characteristics of external light striking onto the image display section that displays an image in accordance with an input of the chrominance signal.

In the above arrangement, it is possible to provide an image with the color tone, in which no change is sensed by the user even if the light characteristics of the external light are changed, by displaying the image with the chrominance signal converted in accordance with the light characteristics of the external light.

The chrominance signal may be converted into a chrominance signal of a color suitable for the light characteristics of the external light that are detected by a sensor.

In this case, the identification of the types of the external light can be performed easily by detecting the light characteristics of the external light via the sensor. Further, it is possible to attain an image with the color tone, in which no change is sensed by the user, in other words, an image in accordance with the light characteristics of the external light, by converting the chrominance signal, which is to be inputted into the image display section, into the chrominance signal of the color suitable for the output of the sensor.

The chrominance signal may be converted into a chrominance signal of a color suitable for the light characteristics of the external light that are selected and read out from among the light characteristics of a plurality of the types of the external light, which are stored in a memory in advance.

In this case, the correction of the chrominance signal before being inputted into the image display section is carried out based on the light characteristics of the external light selected from among the light characteristics of the external light stored in the memory. Thus, an image is displayed with the chrominance signal suitable for the selected light characteristics of the external light.

The user can alternatively select the light characteristics of the external light suitable for the environment where he uses the device, by storing in the memory, as the light characteristics of a plurality of the types of the external light, the light characteristics of the external light, under which the user views the image, for example, the indoor illumination, and outdoor sunlight. Furthermore, it is possible to display an image in the right color for the light characteristics of the external light, that is the color with the color tone, in which no change is sensed by the user.

The conversion of the chrominance signal may be carried out based on a color to display, which has been set according to the light characteristics of the external light and in consideration of color adaptation characteristics of human.

In this case, because the conversion of the chrominance signal is carried out based on the color to display, which has been set according to the light characteristics of the external light and in consideration of color adaptation characteristics of human, the image display section receives the chrominance signal of the color that has been set in consideration of the adaptation to the external light, that is, the color in which the chromatic adaptation characteristics of human is considered. Therefore, the displayed image is an image with the color tone, in which no change is sensed by the user.

The conversion of the chrominance signal may be carried out based on a color reproduced by using three primary colors having chromaticities suitable for the light characteristics of the external light.

In this case, because the conversion of the chrominance signal is carried out based on a color reproduced by using three primary colors having chromaticities suitable for the light characteristics of the external light, the image display section can display an image always in the right color even if the light characteristics of the external light are changed.

The conversion of the chrominance signal may be carried out base on a reproduced color that is a color, according to the light characteristics of the external light, set as an image agreeable with chromatic adaptation characteristics of human, and reproduced by using three primary colors having chromaticities suitable for the light characteristics of the external light.

In this case, because the conversion of the chrominance signal is carried out base on a reproduced color that is a color, according to the light characteristics of the external light, set as an image agreeable with chromatic adaptation characteristics of human, and reproduced by using three primary colors having chromaticities suitable for the light characteristics of the external light, it is possible to display an image in consideration of the chromatic adaptation characteristics of human. Further, the image is displayed with the color tone, in which no change is sensed by the user, and always in the right color even if the light characteristics of the external light are changed.

This can provide an image always in a color suitable for the user, while not affected by the light characteristics of the external light.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image display device comprising:

an image display section for displaying an image in accordance with an input of a chrominance signal; and a chrominance signal converter for converting the chrominance signal to be inputted into the image display section, in accordance with light characteristics of external light incident upon the image display section, the chrominance signal converter including a target display color setting section which uses information regarding the light characteristics of the external light to generate a target display color chrominance signal indicative of a color to display on the image display section for providing an image which agrees with human chromatic adaptation characteristics by referring to tristimulus values of light to which a human vision system adapts as the external light changes; and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

2. The image display device as set forth in claim 1, wherein:

the chrominance signal converter includes a color reproduction section for reproducing the color to display by using three primary colors having chromaticities suitable for the external light, the chrominance signal converter converting the chrominance signal into a chrominance signal of a color reproduced by the color reproduction section.

3. The image display device of claim 1, further comprising means for supplying the information regarding the light characteristics.

4. The image display device of claim 3, wherein the means for supplying the information regarding the light characteristics comprises a sensor.

5. An image display device as set forth in claim 4, wherein the chrominance signal converter converts the chrominance signal into a chrominance signal of a color suitable for an output of the sensor.

6. An image display device, comprising:

a sensor for sensing light characteristics of external light;

an image display section for displaying an image in accordance with an input of a chrominance signal;

a chrominance signal converter for converting the chrominance signal to be inputted into the image display section, in accordance with the light characteristics of the external light that strikes onto the image display section, wherein the chrominance signal converter converts the chrominance signal into a chrominance signal of a color suitable for an output of the sensor;

wherein the chrominance signal converter includes (1) a target display color setting section for setting a color to display as an image agreeable with chromatic adaptation characteristics of a human by referring to tristimulus values of light to which a human vision system adapts as the external light changes, according to the output of the sensor, and (2) a color reproduction section for reproducing a target display color that has been set by the target display color setting section, by using three primary colors having chromaticities suitable for the output of the sensor, the chrominance signal converter converting the chrominance signal into a chrominance signal of a target display color reproduced by the color reproduction section; and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

7. An image display device, comprising:

an image display section for displaying an image in accordance with an input of a chrominance signal; and a chrominance signal converter for converting the chrominance signal to be inputted into the image display section in accordance with light characteristics of external light incident upon the image display section, the chrominance signal converter including (1) a color correction coefficient generator for generating a color correction coefficient in accordance with the light characteristics of the external light, and (2) a color correction section for correcting the chrominance signal by using the color correction coefficient generated by the color correction coefficient generator, wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

8. The image display device as set forth in claim 7, wherein:

the color correction coefficient generator includes (1) a target display color setting coefficient generator for generating a target display color setting coefficient as a first color correction coefficient used for setting a target display color, and (2) a color reproduction coefficient generator for generating a color reproduction coefficient as a second color correction coefficient used for color reproduction, based on the information regarding the light characteristics of the external light, and the color correction section includes (1) a multiplier for calculating a product of (a) the target display color setting coefficient generated by the target display color setting coefficient generator, and (b) the color reproduction coefficient generated by the color reproduction coefficient generator, and (2) a target display color correction section for performing color correction of a chrominance signal, based on a value obtained by the multiplier.

9. The image display device of claim 7, further comprising means for supplying the information regarding the light characteristics.

10. The image display device of claim 9, wherein the means for supplying the information regarding the light characteristics comprises a sensor.

11. The image display device as set forth in claim 10, wherein:

the sensor has a function to resolve wavelength characteristics into at least two different types of wavelength regions, and measures wavelength characteristics of the external light, based on output values in the respective wavelength regions.

12. The image display device of claim 9, wherein the means for supplying the information regarding the light characteristics comprises a memory for storing in advance the light characteristics of a plurality of types of the external light, and wherein the chrominance signal converter converts the chrominance signal into a chrominance signal of a color suitable for the light characteristics of the external light that are selected and read out from the memory.

13. The image display device as set forth in claim 12, wherein:

the memory stores wavelength characteristics of more than two types of wavelength regions of the external light, and outputs the wavelength characteristics as the selected light characteristics of the external light, in accordance with a combination of the stored wavelength characteristics.

14. The image display device as set forth in claim 12, wherein:

the chrominance signal converter includes a target display color setting section which uses information regarding the light characteristics of the external light to generate a target display color chrominance signal indicative of a color to display on the image display section for providing an image which agrees with human chromatic adaptation characteristics.

15. The image display device as set forth in claim 14, wherein:

the chrominance signal converter includes a color reproduction section for reproducing the color to display by using three primary colors having chromaticities suitable for the light characteristics of the external light selected from the memory, the chrominance signal converter converting the chrominance signal into a chrominance signal of a color reproduced by the color reproduction section.

16. An image display device comprising:

an image display section for displaying an image in accordance with an input of a chrominance signal;

a chrominance signal converter for converting the chrominance signal to be inputted into the image display section, in accordance with light characteristics of external light that strikes onto the image display section;

a memory for storing the light characteristics of a plurality of types of the external light;

wherein the chrominance signal converter converts the chrominance signal into a chrominance signal of a color suitable for the light characteristics of the external light that are selected and read out from the memory; and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

17. The image display device as set forth in claim 16, wherein:

the memory stores wavelength characteristics of more than two types of wavelength regions of the external light, and outputs the wavelength characteristics as the selected light characteristics of the external light, in accordance with a combination of the stored wavelength characteristics.

18. The image display device as set forth in claim 16, wherein:

the chrominance signal converter includes a target display color setting section for setting the color to display based on the light characteristics of the external light selected from the memory, the chrominance signal converter converting the chrominance signal into a chrominance signal of a target display color that has been set by the target display color setting section.

19. The image display device as set forth in claim 16, wherein:

the chrominance signal converter includes a color reproduction section for reproducing the color to display by using three primary colors having chromaticities suitable for the light characteristics of the external light selected from the memory, the chrominance signal converter converting the chrominance signal into a chrominance signal of a color reproduced by the color reproduction section.

20. The image display device as set forth in claim 16, wherein:

the chrominance signal converter includes (1) a target display color setting section for setting the color to display based on the light characteristics of the external light selected from the memory, and (2) a color reproduction section for reproducing a target display color that has been set by the target display color setting section, by using three primary colors having chromaticities suitable for the output of the memory, the chrominance signal converter converting the chrominance signal into a chrominance signal of the target display color reproduced by the color reproduction section.

21. An image display device as set forth in claim 16, further comprising:

a sensor for sensing the light characteristics of the external light, wherein the chrominance signal converter selectively performs (1) conversion of a chrominance signal based on an output of the sensor, or (2) conversion of a chrominance signal based on the light characteristics of the external light selected from the memory.

22. The image display device as set forth in claim 21, wherein:

the chrominance signal converter performs the conversion of the chrominance signal based on the light characteristics of the external light selected from the memory, when an illuminance output, which is one of types of the outputs of the sensor, exceeds a certain value.

23. The image display device as set forth in claim 16, wherein:

the memory stores in advance a plurality of types of characteristics of the external light and a plurality of color correction coefficients that vary depending on the light characteristics of the external light; and the chrominance signal converter includes (1) a color correction coefficient generator for reading out a color correction coefficient stored in the memory, based on the selected light characteristics of the external light, and (2) a color correction section for correcting the chrominance signal by using the color correction coefficient that is read out from the memory by the color correction coefficient generator.

24. An electronic apparatus, which has an image display device, comprising:

an image display section for displaying an image in accordance with an input of a chrominance signal; and a chrominance signal converter for converting the chrominance signal to be inputted into the image display section, in accordance with light characteristics of external light incident upon the image display section, the chrominance signal converter including a target display color setting section which uses information regarding the light characteristics of the external light to generate a target display color chrominance signal indicative of a color to display on the image display section for providing an image which agrees with human chromatic adaptation characteristics by referring to tristimulus values of light to which a human vision system adapts as the external light changes, and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

25. An image display method comprising converting a chrominance signal to be inputted into an image display section, in accordance with light characteristics of external light that strikes onto the image display section that displays an image in accordance with an input of a chrominance signal, wherein the chrominance signal is converted into a chrominance signal of a color suitable for the light characteristics of the external light that are selected and read out from among light characteristics of a plurality of types of external light, which are stored in a memory in advance; and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

26. The image display method as set forth in claim 25, wherein the conversion of the chrominance signal is carried out based on a color to display, which is set according to the light characteristics of the external light and in consideration of color adaptation characteristics of a human.

27. The image display method as set forth in claim 25, wherein the conversion of the chrominance signal is carried out based on a color reproduced by using three primary colors having chromaticities suitable for the light characteristics of the external light.

28. The image display method as set forth in claim 25, wherein a color is set, according to the light characteristics of the external light, as an image which agrees with human chromatic adaptation characteristics, the color is reproduced by using three primary colors having chromaticities suitable for the light characteristics of the external light, and the conversion of the chrominance signal is carried out based on the reproduced color.

29. An electronic apparatus, which has an image display device, comprising:

an image display section for displaying an image in accordance with an input of a chrominance signal; and a chrominance signal converter for converting the chrominance signal to be inputted into the image display section, the chrominance signal converter including (1) a color correction coefficient generator for generating a color correction coefficient in accordance with the information regarding the light characteristics of the external light, and (2) a color correction section for correcting the chrominance signal by using the color correction coefficient generated by the color correction coefficient generator.

30. A method of operating an image display device comprising:

obtaining information regarding light characteristics of external light incident upon a screen of the image display device;

using an input chrominance signal and the information regarding the light characteristics of external light to generate a target display color chrominance signal indicative of a color to display for providing an image which agrees with a human chromatic adaptation characteristics by referring to tristimulus values of light to which a human vision system adapts as the external light changes; and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

31. The method of claim 30, further comprising obtaining the information regarding the light characteristics of external light from a sensor.

32. The method of claim 30, further comprising:

obtaining the information regarding the light characteristics of external light from a memory in which are stored the light characteristics of a plurality of types of external light;

converting the chrominance signal into a chrominance signal of a color suitable for the light characteristics of the external light that are selected and read out from the memory.

33. A method of operating an image display device comprising:

obtaining information regarding light characteristics of external light incident upon a screen of the image display device;

using a color correction coefficient generator to generate a color correction coefficient with respect to the external light incident upon the screen;

correcting an input chrominance signal using the color correction coefficient; and applying the corrected input chrominance signal to an image display section; and wherein, from wavelength distribution characteristics of external light and optical wavelength distribution characteristics, chromaticity coordinates values of the three primary colors are determined for external light, and correction is performed on the chrominance signal so that image display is carried out based on the chromaticity coordinates.

34. The method of claim 33, further comprising obtaining the information regarding the light characteristics of external light from a sensor.

35. The method of claim 33, further comprising:

obtaining the information regarding the light characteristics of external light from a memory in which are stored the light characteristics of a plurality of types of external light;

converting the chrominance signal into a chrominance signal of a color suitable for the light characteristics of the external light that are selected and read out from the memory.

* * * * *